United States Patent [19]

Wessling et al.

[11] 3,899,504

[45] Aug. 12, 1975

[54] CERTAIN BENZAZOLYLAMINO-ANTHRAQUINONES

[75] Inventors: Diether Wessling; Heinrich Leister, both of Cologne; Eberhart Degener, Opladen, all of Germany

[73] Assignee: Bayer Aktiengesellschaft, Leverkusen-Bayerwerk, Germany

[22] Filed: Dec. 3, 1971

[21] Appl. No.: 204,722

[30] Foreign Application Priority Data
Dec. 4, 1970  Germany.............................. 2059724

[52] U.S. Cl. ............................ 260/303; 8/7; 8/34; 8/39; 106/193 D; 106/204; 260/13; 260/37; 260/38; 260/39; 260/40; 260/41; 260/41.5; 260/256.4 Q; 260/258.5 R; 260/277; 260/278; 260/304; 260/307 D; 260/307.5
[51] Int. Cl. ...................... C07d 91/34; C07d 85/48
[58] Field of Search........................ 260/303, 307.5

[56] References Cited
UNITED STATES PATENTS
3,313,823   4/1967   Simonnet et al................. 260/307.5

*Primary Examiner*—Richard J. Gallagher
*Attorney, Agent, or Firm*—Plumley & Tyner

[57] ABSTRACT

Dyestuffs with pigment properties are obtained, by acylating dyestuffs of the anthraquinone and anthraquinoid series which have at least one amino or mercapto group with tetrabromo- or tetrachlorobenzthiazoles or benzoxazoles which are substituted in the 2-position with an anionic leaving-group. Subject of the invention are furthermore the acylation reagents 2-chlorotetrabromobenzthiazole and 2-chlorotetrabromobenzoxazol, which are manufactured by chlorination of benzthiazol, respectively benzoxazol in the 2-position and subsequent bromination of the benzene nucleus.

3 Claims, No Drawings

CERTAIN BENZAZOLYLAMINO-ANTHRAQUINONES

The subject of the invention are heterocyclic compounds of the formula

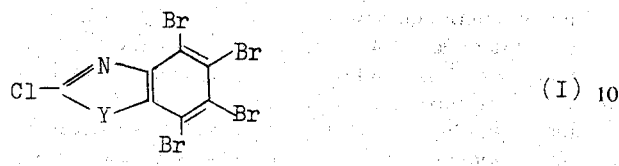

wherein

Y denotes S or O, processes for their manufacture, and the use of the heterocyclic compounds as acylating components of anthraquinonoid dyestuffs.

A further subject of the invention are dyestuffs free of sulfonic acid groups of the general formula

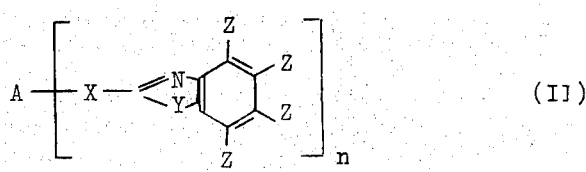

which where produced by acylating with compounds of formula I, wherein

A represents an anthraquinone, anthrapyrimidine, isothiazoleanthrone, pyrazolanthrone, anthrpyridone, phthaloylacridone or phthaloylbenzimidazole radical, X represents NH or S, Y represents S or O, Z represents Cl or Br and $n$ represents the numbers 1, 2 or 3.

A further subject of the invention are processes for their manufacture, and dyestuffs thus obtainable. The invention also relates to the use of dyestuffs of the Formula II as pigments.

According to the invention, the unsubstituted base substances and their substitution products are understood by the terms anthraquinone, anthrapyrimidine, isothiazolanthrone, pyrazolanthrone, anthrapyridone, phthaloylacridone and phthaloylbenzimidazole radicals.

As substituents in the substitution products, the following radicals can in particular be used: halogen atoms, such as fluorine, chlorine or bromine, nitro groups, alkyl groups with 1 – 12 C atoms, preferably with 1 – 4 C atoms, trifluoromethyl groups, cycloalkyl groups, uncondensed cyclohexyl or benzene rings, amino groups, N,N-dialkylamino groups with identical or different alkyl radicals each with 1 – 6 C atoms, and wherein the alkyl radicals can optionally be cyclised via a hetero-atom such as oxygen, sulphur or nitrogen, arylamino groups, especially those of the benzene series, alkylcarbonylamino groups with 1 – 18 C atoms, arylcarbonylamino groups, for example benzoylamino or naphthoylamino groups, hydroxyl groups, alkoxy groups, especially those with 1 – 3 C atoms, aryloxy groups, especially those of the phenoxy series, alkylsulphonyl groups with 1 – 6 C atoms, arylsulphonyl groups, carboxyl groups, carboxylic acid ester groups, especially those with 1 – 6 carbon atoms in the alkyl chain, carbamoyl groups, N-monoalkylylated or dialkylated carbamoyl groups, which can optionally independently of one another possess 1 – 6 C atoms in the alkyl chain, sulphamoyl groups, N-monoalkylated or dialkylated sulphamoyl groups, which can optionally independently of one another possess 1 – 6 C atoms in the alkyl chains, alkylmercapto groups with 1 – 6 carbon atoms, arylmercapto groups, especially phenylmercapto groups, alkylsulphonylamino groups with 1 – 6 carbon atoms, arylsulphonylamino groups, especially those of the benzene series, alkylsulphonic acid ester groups with 1–6 carbon atoms, arylsulphonic acid ester groups, especially those of the benzene series, phenolsulphonic acid ester groups or phenylalkoxy groups; here, the term alkyl groups includes straight-chain and branched-chain, alicyclic, saturated (especially cyclohexyl) and unsaturated (for example allyl) alkyl radicals, and also alkyl radical substituted by aromatic structures (for example benzyl).

Within the framework of the dyestuffs according to the invention, those wherein A represents an anthraquinone radical which is substituted or unsubstituted but is not fused to further cyclic radicals are preferred.

Particularly preferred dyestuffs are those of the formula

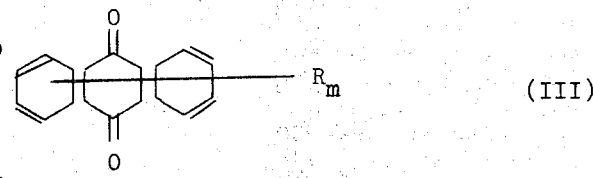

wherein

R represents one of the abovementioned substitutents and $m$ represents the numbers 0, 1, 2, 3, 4, 5 or 6, with the proviso that at least one of the 4 $\alpha$-positions of the anthraquinone ring system denotes a radical

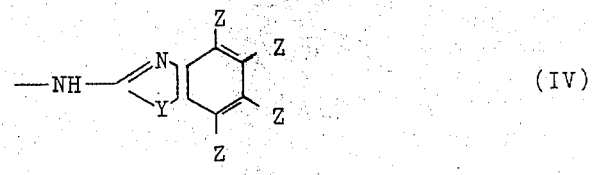

wherein

Y and Z have the indicated meaning. Within the framework of the dyestuffs according to the invention, particularly valuable dyestuffs are those wherein 1 or 2 $\alpha$-positions are occupied by radicals IV and the anthraquinone ring system can optionally contain one, two or three identical or different hydroxyl, chlorine, —NH$_2$, methoxy or anilino radicals.

Particularly valuable are, dyestuffs of the formulae II and III, as well as those of the groups which have been singled out, wherein Z represents bromine, The dyestuffs according to the invention, of the formula II, are manufactured according to processes which are in themselves known, by reaction of compounds of the formula

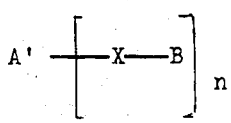

wherein

X and n have the abovementioned meaning,

A' represents an anthraquinone, anthrapyrimidine, isothiazoleanthrone, pyrazolanthrone, anthrapyridone, phthaloylacridone or phthaloylbenzimidazole radical and B represents hydrogen or a metal atom, with at least n mol of

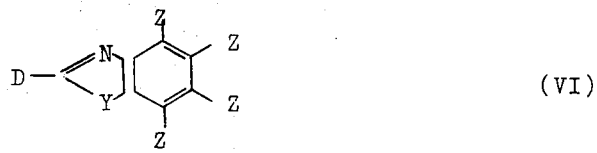

wherein

Y, Z and n have the abovementioned meaning and

D represents a radical which can be split off as an anion, followed, if desired, by alkylation, arylation, acylation and/or cyclisation. Suitable metal atoms B are especially sodium and potassium.

Radicals D which are suitable according to the invention are, for example, halogen atoms such as fluorine, chlorine and bromine, alkylsulphonyl radicals such as methylsulphonyl and ethylsulphonyl, aralkylsulphonyl radicals, especially benzylsulphonyl radicals, arylsulphonyl radicals, especially those of the benzene series, such as phenylsulphonyl and 4-nitrophenylsulphonyl, or quaternary ammonium groups such as trimethylammonium, 1,1-dimethylhydrazinium and 2-N-aminopiperidinium.

B in particular represents hydrogen.

Amongst the radicals D, halogen atoms such as fluorine, chlorine and bromine are of particular importance; for economic reasons, chlorine is particularly preferred as the radical D.

Arylations can in particular be carried out with anthraquinone or benzanthrone derivatives which carry reactive halogen atoms, such as Bz - 1-bromobenzanthrone or 1-chloroanthraquinone.

Cyclisations can in particular be undergone by suitable anthraquinone derivatives to give anthrapyrimidines.

The preparation of the dyestuffs according to the invention can be carried out at temperatures of about 80°C to about 210°C, preferably at 100°C to 180°C. Temperatures between 130°C and 180°C are particularly preferred.

The reaction takes place in high-boiling organic solvents, such as nitrobenzene, dichlorobenzenes, trichlorobenzenes, naphthalene, monoethylene glycol monoalkyl ethers or dialkyl ethers, tetramethylenesulphone and phenol.

Phenol is preferred. It is frequently advantageous for acid-binding agents, such as sodium carbonate or potassium carbonate, to be present. At times it is advisable to add catalysts, such as the chlorides of copper, iron or zinc.

Dyestuffs of the formula (III), and dyestuffs of the groups mentioned as being preferred, are obtainable in the same manner.

Suitable compounds of the formula (V) are, for example: 1-amino-anthraquinone, 2-amino-anthraquinone, 1,4-, 1,5-, 1,6- 1,7-, 1,8- or 2,6-diamino-anthraquinone, 1,2,4-triamino-anthraquinone, 1,4,5,8-tetramino-anthraquinone, 1-amino-4-hydroxy-anthraquinone, 1-amino-4-methoxy- or isopropoxy-anthraquinone, 1-amino-5-hydroxy-anthraquinone, 1-amino-2-methoxy-4-hydroxy-anthraquinone, 1-amino-4,5,8-trihydroxy-anthraquinone, 3-amino-1,2-dihydroxy-anthraquinone, 2-amino-3-hydroxy-anthraquinone, 1,8-diamino-4,5-dihydroxy-anthraquinone, 4,8-diamino-1,5-dihydroxy-anthraquinone, 4,8-diamino-1-hydroxy-anthraquinone, 4-amino-8-chloro-1-hydroxy- or -methoxy-anthraquinone, 2- and 5-amino-1,4-dihydroxy-anthraquinone, 1,4-diamino-5-nitro-anthraquinone, 4-, 5-, 6- or 7-chloro-1-amino-anthraquinone, 5,8- or 6,7-dichloro-1-amino-anthraquinone, 6- or 7-fluoro-1-amino-anthraquinone, 6,7-difluoro-1-amino-anthraquinone, 4,5,8-trichloro-1-amino-anthraquinone, 5,8-dichloro-1,4-diamino-anthraquinone, 4-chloro-1,5-diamino-anthraquinone, 4-nitro-1-amino-anthraquinone, 5-nitro-1-amino-anthraquinone, 4-amino-1-methylamino-anthraquinone, 4-amino-1-butylamino-anthraquinone, 4-amino-1-dodecylamino-anthraquinone 4-amino-1-octadecylamino-anthraquinone, 4-amino-1-cyclohexylamino-anthraquinone, 4-amino-1-anilino-anthraquinone, 4-amino-1-(p-toluidino)-anthraquinone, 4-amino-1-(4'-chloro-anilino)-anthraquinone, 4-amino-1-(2', 4'-dichloro-anilino)-anthraquinone, 4-amino-1-(p-anisidino)-anthraquinone, 4,5,8-triamino-1-hydroxy-anthraquinone, 8-chloro-5-amino-1,4-dihydroxy-anthraquinone, 8-nitro-4-amino-1,5-dihydroxy-anthraquinone, 5-nitro-4-amino- 1,8-dihydroxy-anthraquinone, the mixtures which are obtained on bromination of 4,8-diamino-1,5-dihydroxy- or of 4,5-diamino-1,8-dihydroxy-anthraquinone in, for example, sulphuric acid, and which contain about one atom of bromine per mol of 4,8-diamino-1,5-dihydroxy- or 4,5-diamino-1,8-dihydroxy-anthraquinone, 1-amino-anthraquinone-2-carboxylic acid, 1-amino-anthraquinone-2-carboxylic acid amide, 1-amino-anthraquinone-2-carboxylic acid methyl ester, ethyl ester, n-propyl ester or n-butyl ester, 1-amino-2-acetyl-anthraquinone, 4-amino-1-(p-toluenesulphamido)-2-(phenyl-sulphonyl)-anthraquinone, 1-amino-6-methylmercapto-anthraquinone, 1-amino-6- (4'-chloro-phenylsulphonyl)-anthraquinone, 1-amino-2-bromo-4-(p-toluenesulphamido)-anthraquinone, 2-phenyl-6-amino-4,5-phthaloyl-benzimidazole, 6-chloro-2-amino-3,4-phthaloylacridone, 5-chloro-8-amino-3,4-phthaloyl-acridone, 4,4'-diamino-1,1'-dianthrimide, 1-mercapto-anthraquinone and 1,4-, 1,5- or 1,8-dimercapto-anthraquinone.

Further, polymercapto compounds and aminomercapto compounds are suitable reactants of the formula (V).

A further group of starting compounds of the formula (V) are those which possess one or more acylated amino and/or mercapto groups, but wherein at least one amino or mercapto group is not acylated and is hence available for reaction with compounds of the formula (VI). The acylation can be carried out in a manner which is in itself known, with suitable carboxylic acids and/or sulphonic acids or with their derivatives, for example the halides, such as the fluorides, chlorides or bromides, preferably the chlorides.

Such acyl radicals are for example derived from the following acids: formic acid, acetic acid, propionic acid, butyric acid, lauric acid, palmitic acid, stearic acid, oxalic acid, benzoic acid, 2-, 3- or 4-chlorobenzoic acid, 4-fluoro-benzoic acid, 2,4-difluoro-benzoic acid, 2,4-, 2,5- or 3,4-dichloro-benzoic acid, 2,4,5-trichloro-benzoic acid, 2,3,4,5-, 2,3,5,6- or 2,3,4,6-tetrachlorobenzoic acid, pentachloro-benzoic acid, 4-fluoro-2-chloro-benzoic acid, 2-fluoro-4-chloro-benzoic acid, 2-bromo-benzoic acid, 4-chloro-2-bromo-benzoic acid, 2-chloro-4-bromo-benzoic acid, 2,4-dibromo-benzoic acid, 2-, 3- or 4-nitro-benzoic acid, 6-chloro-3-nitro-benzoic acid, 2,4-, 3,4- or 3,5-dinitro-benzoic acid, 2-, 3- or 4-methyl-benzoic acid, 3- or 4trifluoromethyl-benzoic acid, 4-nitro-3-methyl-benzoic acid, 3-nitro-4-methyl-benzoic acid, 4-tert. butyl-benzoic acid, 4-phenyl-benzoic acid, 2-hydroxy-benzoic acid, 2-methoxy-benzoic acid, 4-chloro-2-hydroxy-benzoic acid, 4-methoxy-benzoic acid, 1-naphthoic acid, 4-chloro-3-nitro-benzoic acid, 3-nitro-4-methoxy-benzoic acid, phenylacetic acid, nicotinic acid, isonicotinic acid, 2,6-dichloro-pyridine-4-carboxylic acid, 2-chloro-pyridine, 5-carboxylic acid, 3,5-bis-(methylsulphonyl)-isothiazole-4-carboxylic acid, 3,5-bis-(methylmercapto)-isothiazole-4 -carboxylic acid, phthalic acid, isophthalic acid, and terephthalic acid, p-toluenesulphonic acid, benzenesulphonic acid, 3- or 4-nitro-benzenesulphonic acid, 2-, 3- or 4-chlorobenzenesulphonic acid and 2,5- or 3,4-dichloro-benzenesulphonic acid.

As already explained, the acylation of the amino, mercapto and aminomercapto compounds of the general formula (V) with suitable derivatives of the carboxylic acids and sulphonic acids mentioned as an example above can also be carried out after the reaction of compounds of the formula (V) with compounds of the formula (VI).

Both reaction steps can frequently also be carried out in a "one-pot process".

If D represents a different radical than halogen, reactants of the general formula (VI) are obtainable according to processes which are in themselves known, by amination or acylation of compounds of the formula

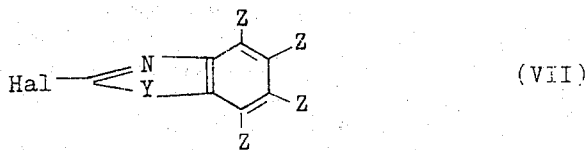

(VII)

wherein
Y and Z have the abovementioned meaning and Hal represents a halogen atom.

Compounds of the formula (VII) are obtainable by chlorination or bromination of benzthiazoles and benzoxazoles and, if appropriate, replacement of the chlorine or bromine atom in the 2-position by a fluorine radical. The chlorination and bromination can be carried out with or without solvent. Suitable solvents for optional use are, in particular trichlorobenzenes or tetrachlorobenzenes, carbon tetrachloride, chlorosulphonic acid and bromosulphonic acid. A replacement of chlorine or bromine by fluorine can be effected with anhydrous hydrofluoric acid, optionally in the presnece of Lewis acids, above all antimony pentachloride.

According to the invention, benzthiazoles and benzoxazoles which are substituted in the 2-position and are optionally partially brominated in the benzene nucleus are to be used preferentially. Possible components to be employed in this way are especially those which are substituted in the 2-position by a chlorine atom, a mercapto group or a sulphonic acid group.

In particular, compounds of the formula I are obtained if 2-chloro-benzthiazoles and 2-chloro-benzoxazoles which are optionally partially brominated in the benzene nucleus are treated with bromine, if desired in the presence of heavy metal salts and/or iodine as catalysts, and optionally in the presence of diluents, at temperatures of about 0°C to about 200°C.

The reaction is preferably carried out at temperatures between room temperature and about 130°C; 50°C to 120°C is a particularly preferred temperature range.

It is frequently advisable to start the action of bromine at a gentle temperature, that is to say about 50°C, and finally to raise the temperature to 120°C.

The reaction can be carried out in an open vessel or under pressure.

Possible diluents are especially chlorobenzene, dichlorobenzenes and trichlorobenzenes, nitrobenzene and chlorosulphonic acid and/or oleum. The bromination takes place particularly rapidly and with high yield if chlorosulphonic acid is used as the reaction medium.

As catalysts, apart from iodine, the heavy metal halides known as halogen transfer agents are above all used, for example iron-(III) chloride, antimony-(III) chloride, aluminium chloride, titanium-(IV) chloride, molybdenum-(V) chloride, zinc chloride and zirconium-(IV) chloride.

Slight contamination resulting from the method of manufacture does not impair the usability of the reaction products as acylation components of anthraquinonoid dyestuffs.

The following compounds can, for example, be used as starting components for the bromination: benzthiazole, 2-chlorobenzthiazole, 2-mercaptobenzthiazole, benzthiazole-2-sulphonic acid, benzoxazole, 2-chlorobenzoxazole and benzoxazole-2-sulphonic acid; derivatives of benzthiazole and of benzoxazole which are already partially brominated in the nucleus, such as 6-bromo-2-mercaptobenzoxazole and 6-bromo-2-chlorobenzthiazole, can equally well be employed.

The dyestuffs obtained are suitable for dyeing various materials, but are especially suitable for use as pigments. As a result of their outstanding fastness to light and good fastness to migration they can be used for the most diverse applications of pigments.

The new dyestuffs of the formula (II) are obtained in a form suitable for pigments or can, in order to convert them into a form suitable for pigments, be converted into a finely divided state by an after-treatment which is in itself known, for example by dissolving or swelling in strong organic acids such as sulphuric acid and pouring out onto ice. The finely divided state can also be achieved by grinding with or without grinding auxiliaries, such as inorganic salts or sand, optionally in the presence of solvents, such as toluene, xylene, dichlorobenzne or N-methylpyrrolidone. The colour strength and transparency of the pigment can be influenced by varying the after-treatment.

The pigments according to the invention can be used for the manufacture of very fast pigmented systems, such as mixtures with other substances, preparations, paints, printing inks, coloured paper and coloured macromolecular substances. By mixtures with other substances there may, for example, be understood mixtures with inorganic white pigments, such as titanium dioxide (rutile) or with cement. Preparations are, for example, flush pastes with organic liquids, or pastes and fine pastes with water, dispersing agents annd, if appropriate preservatives. The description paints for example represents physically drying or oxidatively drying lacquers, stoving lacquers, reactive lacquers, two-component lacquers, dispersion paints for weather-resistant coatings, and distempers. By printing inks, those for paper, textile and tinplate printing are to be understood. The macromolecular substances can be of natural origin, such as rubber, can be obtained by chemical modification, such as acetylcellulose, cellulose butyrate or viscose, or can be produced synthetically, such as polymers, polyaddition products and polycondensates. There may be mentioned plastic compositions, such as polyvinyl chloride, polyvinyl acetate, polyvinyl propionate, polyolefines, for example polyethylene terephthalate, polyamides, high molecular polyamides, polymers and copolymers of acrylic esters, methacrylic esters, acrylonitrile, acrylamide, butadiene and styrene, and polyurethanes and polycarbonates. The substances pigmented with the products claimed can be in any desired form.

The compounds according to the invention possess outstanding pigment properties and do not only have excellent fastness to water, oil, acid, lime, alkali, solvent, overlacquering, overspraying, sublimation, heat and vulcanisation, but are also of very high yield, can be distributed well in plastic compositions, and have outstanding fastness to light and weathering.

The parts mentioned in the examples are parts by weight. The temperatures are given in °C.

EXAMPLE 1:

a. 110 parts of 1,5-diamino-anthraquinone and 330 parts of pentachloro-benzthiazole (German Patent No. 1,168,911) are introduced into 1,500 parts of fused phenol at 80° –100°. The mixture is heated to 160° whilst stirring and is kept at this temperature for one hour. Thereafter it is heated for a further 8 hours to 180° and cooled to 80° –90°. 1000 parts of methanol are run in and the product is filtered off hot, washed with methanol until free of phenol, and dried at 100°.

322 parts of 1,5-bis-(4,5,6,7-tetrachloro-benzthiazolyl-(2)-amino)-anthraquinone are obtained in the form of red lancet-shaped crystals which give a brown-yellow solution in concentrated sulphuric acid.

If, instead of 1,5-diamino-anthraquinone, the same amount of 1,4-diamino-anthraquinone is employed, 283 parts of 1,4-bis-(4,5,6,7-tetrachloro-benzthiazolyl-(2)-amino)-anthraquinone are obtained in the form of blue-violet, fine, hair-like small needles which give an orange solution in concentrated sulphuric acid.

If, instead of 1,5-diamino-anthraquinone, the same amount of 1,4-diamino-anthraquinone is employed, 283 parts of 1,4-bis-(4,5,6,7-tetrachloro-benzthiazolyl-(2)-amino)-anthraquinone are obtained in the form of blue-violet, fine, hair-like small needles which give an orange solution in concentrated sulphuric acid.

If, instead of 1,5-diamino-anthraquinone, the same amount of 1,8-diamino-anthraquinone is employed, and instead of pentachloro-benzthiazole the equivalent amount of pentachloro-benzoxazole is employed, 261 parts of 1,8-bis-(4,5,6,7-tetrachloro-benzoxazolyl-(2)-amino)-anthraquinone are obtained in the form of red needles which give an orange solution in concentrated sulphuric acid.

Manufacture of pentachlorobenzoxazole via 2-chlorobenzoxazole:

453 parts of 2-mercapto-benzoxazole are introduced at 0° into a solution of 300 parts of phosgene and 3 parts of dimethylformamide in 1,500 parts of chloroform. The mixture is stirred for 1.5 hours at 0° to 10°C, phosgene is passed in for 8 hours under reflux and is then flushed out with nitrogen, and the mixture is distilled. At 87°C/16 mm Hg, 399 parts of 2-chlorobenzoxazole = 86 percent of theory, pass over.

384 parts of 2-chloro-benzoxazole are mixed with 8 parts anhydrous iron-(III) chloride and chlorinated for 8 hours at 80° to 90°C. When the evolution of HCl has subsided, the temperature is slowly raised to 200°C, optionally adding fresh catalyst (2 parts of $FeCl_3$ + 2 parts of $SbCl_3$). When the melting point of the reaction product is about 139°C, the chlorination is stopped. The product is taken up in benzene, the solution is washed with dilute hydrochloric acid, separated off and concentrated, and the residue is distilled under an oil-pump vacuum. Boiling point 174° to 176°C/1.3 mm. Yield 578 parts = 79 percent of theory of pentachlorobenzoxazole. Melting point 141°C.

b. 8 parts of 1,5-bis-(4,5,6,7-tetrachloro-benzthiazolyl-(2)-amino)-anthraquinone, which have been brought to a finely divided state by grinding in a vibratory mill with 2 parts of xylene and 160 parts of sodium chloride and eluting the sodium chloride component, are ground on an automatic Hoover-Muller grinding machine with a stoving lacquer of 25 parts of coconut oil alkyd resin (40 percent of coconut oil), 19 parts of melamine resin, 50 parts of toluene and 7 parts of gylcol monomethyl ether. The mixture is applied to the substrate to be lacquered, the lacquer is cured by stoving at 130°C, and red lacquerings of good covering power, having good fastness to overlacquering and excellent fastness to light and weathering, are obtained.

Pigmented stoving lacquers of equal fastness properties are obtained if 15 – 25 parts of the alkyd resin indicated or of an alkyd resin based on cottonseed oil, caster oil or synthetic fatty acids are used and if instead of the indicated amount of melamine resin 10 – 15 parts of the melamine resin mentioned or of a condensation product of formaldehyde with urea or with benzoguanamine are employed. Pigmented stoving lacquers of similar good fastness properties and of a blue or red colour shade are obtained if instead of the indicated 1,5-bis-(4,5,6,7-tetrachloro-benzthiazolyl-(2)-amino)-anthraquinone corresponding amounts of finely divided 1,4-bis-(4,5,6,7-tetrachloro-benzthiazolyl-(2)-amino)-anthraquinone or 1,8-bis-(4,5,6,7-tetrachloro-benzoxazolyl)-(2)-amino)-anthraquinone are employed.

If, instead of the indicated amount of pigment, 1 to 10 parts of a mixture of titanium dioxide (rutile type) with one of the pigments indicated in Example 1b), in the ratio of 0.5 – 50 : 1, are grounded into the lacquer indicated in Example 1b), and the subsequent processing is the same, lacquerings of equal fastness properties are obtained showing a red or blue colour shade displaced towards white as the titanium dioxide content increases.

Lacquerings with similar fastness properties are obtained on using physically drying spirit lacquers, zapon lacquers and nitro lacquers, air-drying oil lacquers, synthetic resin lacquers and nitro-combination lacquers, and stoving and air-drying epoxide resin lacquers, optionally in combination with urea, melamine, alkyd or phenolic resins.

If reactive lacquers based on unsaturated polyester resin or amine-curing expoxide resin lacquers with dipropylenetriamine as the amine component are used, red or blue lacquerings of outstanding fastness to weathering and to efflorescence are obtained.

Pigmentations of similar fastness are obtained on using other two-component lacquers based on aromatic or aliphatic isocyanates and polyethers or polyesters containing hydroxyl groups, as well as with polyisocyanate lacquers yielding moisture-drying polyurea lacquerings.

c. 5 parts of a fine paste obtained by kneading 50 parts of 1,5-bis-(4,5,6,7-tetrachloro-benzthiazolyl-(2)-amino)-anthraquinone with 15 parts of an arylpolyglycol-ether emulsifier and 35 parts of water are mixed with 10 parts of baryte as a filler, 10 parts of titanium dioxide (rutile type) as a white pigment and 40 parts of an aqueous dispersion paint, containing approx. 50 percent of polyvinyl acetate. The paint is brushed on, and after drying red paint films of very good fastness to lime and to cement, as well as excellent fastness to weathering and to light, are obtained.

The fine paste obtained by kneading is equally suitable for pigmenting clear polyvinyl acetate dispersion paints, dispersion paints which contain copolymers of styrene and maleic acids as binders, and dispersion paints based on polyvinyl propionate, polymethacrylate or butadiene-styrene, and glue-based wallpaper paints containing chalk.

Paint films of a blue or red colour shade and similar fastness properties are obtained if instead of the indicated 1,5-bis-(4,5,6,7-tetrachloro-benzthiazolyl-(2)-amino)-anthraquinone corresponding amounts of 1,4-bis-(4,5,6,7-tetrachloro-benzthiazolyl-(2)-amino)-anthraquinone or 1,8-bis-(4,5,6,7-tetrachloro-benzoxazolyl-(2)-amino)-anthraquinone are used.

To manfacture the pigment paste, it is also possible to use other non-ionic emulsifiers, such as the reaction products of nonylphenol with ethylene oxide, or ionic wetting agents, such as the sodium salts of alkylarylsulphonic acids, for example of dinaphthylmethane disulphonic acid, sodium salts of substituted sulpho-fatty acid esters and sodium salts of paraffin-sulphonic acids in combination with alkyl polyglycol-ethers.

d. A mixture of 65 parts of polyvinyl chloride, 35 parts of diisooctyl phthalate, 2 parts of dibutyl-tin mercaptide, 0.5 part of titanium dioxide and 0.5 part of 1,-5-bis-(4,5,6,7-tetrachloro-benzthiazolyl-(2)-amino)-anthraquinone, which has been brought into a finely divided state by grinding with sodium chloride in the presence of white spirit, is pigmented on a mixing mill at 165°C. An intensely red-coloured mass is obtained, which can be used for the manufacture of sheets or mouldings. The dyeing is distinguished by excellent fastness to light and very good fastness to plasticiser.

Dyeings of a blue or red shade, respectively, and of similar fastness properties are obtained if the indicated 1,5-bis-(4,5,6,7-tetrachloro-benzthiazolyl)-(2)-amino)-anthraquinone is replaced by corresponding amounts of 1,4-bis-(4,5,6,7-tetrachloro-benzthiazolyl-(2)-amino)-anthraquinone or 1,8-bis-(4,5,6,7-tetrachloro-benzoxazolyl-(2)-amino)-anthraquinone.

Red or blue moulding of very good fastness to light and to migration are obtained if 0.2 part of the indicated pigments, brought to a finely divided state, are mixed with 100 parts of polyethylene, polypropylene or polystyrene granules and the mixture is directly moulded on an injection moulding machine at 220° to 280°C or processed on an extruder to give dyed rods or on a mixing mill to give coloured hides. The hides or rods are granulated, if required, and moulded in an injection moulding machine.

In a similar manner, synthetic polyamides of caprolactam or adipic acid and hexamethylenediamine, or the condensates of terephthalic acid and ethylene glycol, can be dyed at 280° – 300°C, if necessary under a nitrogen atmosphere.

If 1 part of the indicated pigments, brought to a finely divided state, is mixed with 10 parts of titanium dioxide (rutile type) and 100 parts of a copolymer based on acrylonitrile-butadiene-styrene, which is in the form of a powder, and the pigment is worked in on a mill at 140° –180°C, a red or blue hide is obtained, which is granulated and moulded in an injection moulding machine at 200° – 250°C. Red or blue mouldings of very good fastness to light and to migration and of excellent heat resistance are obtained.

Plastics based on cellulose acetate, cellulose butyrate or their mixtures are coloured to give similar fastness properties by following a similar procedure, but at temperatures of 180° – 220°C and without adding titanium dioxide.

Red or blue transparent granules of excellent fastness to light and excellent heat resistance are obtained if 0.2 part of the indicated pigments, in a finely divided form, are mixed with 100 parts of a plastic based on polycarbonate, in an extruder or in a kneading screw, at 250° – 280°C, and the mixture is converted into granules.

e. 90 parts of a slightly branched polypropylene glycol having a molecular weight of 2,500 and a hydroxyl number of 56, 0.25 part of endoethylenepiperazine, 0.3 part of tin-(II) octoate, 1.0 part of a polyether-siloxane, 3.5 parts of water and 12.0 parts of a paste of 10 parts of finely divided 1,5-bis-(4,5,6,7-tetrachloro-benzthiazolyl-(2)-amino)-anthraquinone in 50 parts of the indicated polypropylene glycol are well mixed with one another and subsequently intimately mixed with 45 parts of toluylene-diisocyanate (80 percent of 2,4-isomer and 20 percent of 2,6-isomer) and poured into a mould. The mixture turns cloudy after 6 seconds, and a foam forms. After 70 seconds, an intensely red-coloured, soft polyurethane foam has formed, the pigmentation of which shows excellent fastness to light.

A red soft polyurethane foam of equally light-fast pigmentation is obtained if 90 parts of a slightly branched polyester of adipic acid, diethylene glycol and trimethylolpropane, having a molecular weight of 2,000 and a hydroxyl number of 60, is mixed with the following components: 1.2 parts of dimethylbenzylamine, 2.5 parts of sodium castor oil-sulphate, 2.0 parts of an oxethylated benzylated hydroxydiphenyl, 1.75 parts of water and 12 parts of a paste, manufactured by grinding 10 parts of 1,5-bis-(4,5,6,7-tetrachloro-benzthiazolyl-(2)-amino)-anthraquinone, brought to a finely divided state, in 50 parts of the abovementioned polyester, and if, after mixing whilst stirring, 40 parts of toluylenediisocyanate (65 percent of 2,4-isomer and 35 percent of 2,6-isomer) are stirred in and the mixture is poured into a mould and diluted.

Blue and red soft polyurethane foams of similar lightfast pigmentation are obtained on replacing the 1,5-bis-(4,5,6,7-tetrachloro-benzthiazolyl-(2)-amino)-anthraquinone by corresponding amounts of 1,4-bis-(4,5,6,7-tetrachloro-benzthiazolyl-(2)-amino)-anthraquinone or 1,8-bis-(4,5,6,7-tetrachloro-benzoxazolyl-(2)-amino)-anthraquinone, respectively.

f. Blue offset prints of high colour strength and very good fastness to light and to lacquering are obtained with a printing ink prepared by grinding 35 parts of 1,4-bis-(4,5,6,7-tetrachloro-benzthiazolyl-(2)-amino)-anthraquinone, brought to a finely divided state, with 65 parts of linseed oil and adding 1 part of drier (Co naphthanate, 50 percent strength in white spirit). The use of this printing ink in letterpress printing, photoprinting, lithographic printing or gravure printing leads to blue prints of similar fastness properties. If the pigment is used for colouring tinplate printing inks or inks or colours of low viscosity for intaglio printing, blue prints of similar fastness properties are obtained.

If the 1,4-bis-(4,5,6,7-tetrachloro-benzthiazolyl-(2)-amino)-anthraquinone is replaced by corresponding amounts of 1,5-bis-(4,5,6,7-tetrachloro-benzthiazolyl-(2)-amino)-anthraquinone or 1,8-bis-(4,5,6,7-tetrachloro-benzoxazolyl-(2)-amino)-anthraquinone, red prints of similar fastness are obtained.

g. A printing paste is prepared from 10 parts of one of the fine pigment pastes indicated in Example 1c), 100 parts of 3 percent strength tragacanth, 100 parts of an aqueous 50 percent strength egg albumen solution and 25 parts of a non-ionic wetting agent. A textile fibre fabric is printed and steamed at 100°C, and a red or blue print is obtained which is distinguished by excellent fastness properties, especially fastness to light. In the printing mix, the tragacanth and egg albumen can be replaced by other binders which can be used for fixing to the fibre, for example those based on synthetic resins, British gum or cellulose glycollate.

h. A mixture of 100 parts of light crepe, 2.6 parts of sulphur, 1 part of stearic acid, 1 part of mercaptobenzthiazole, 0.2 part of hexamethylenetetramine, 5 parts of zinc oxide, 60 parts of chalk and 2 parts of titanium dioxide (anatase type) is pigmented with 2 parts of 1,5-bis-(4,5,6,7-tetrachloro-benzthiazolyl-(2)-amino)-anthraquinone on a mixing mill at 50°C and is then vulcanised for 12 minutes at 140°C. A red-coloured vulcanised product of very good fastness to light is obtained.

A vulcanised product, coloured blue or red, of similar fastness to light is obtained if corresponding amounts of 1,4-bis-(4,5,6,7-tetrachloro-benzthiazole-(2)-amino)-anthraquinone or 1,8-bis-(4,5,6,7-tetrachloro-benzoxazolyl-(2)-amino)-anthraquinone, respectively, are used in place of 1,5-bis-(4,5,6,7-tetrachloro-benzthiazolyl-(2)-amino)-anthraquinone.

i. 100 parts of a 20 percent strength aqueous paste of 1,5-bis-(4,5,6,7-tetrachloro-benzthiazolyl-(2)amino)-anthraquinone, for example manufactured by dissolving the dyestuff in 100 percent strength sulphuric acid at 15° – 20°C, pouring the solution out onto ice, filtering and washing the product with water until neutral, are mixed with 22,500 parts of an aqueous, approximately 9 percent strength, viscose solution in a stirring apparatus. The coloured composition is stirred for 15 minutes, subsequently de-aerated, and subjected to a spinning and desulphurisation process. Red-coloured filaments or films of very good fastness to light are obtained.

Blue- or red-pigmented filaments or films of similar fastness are obtained if a 20 percent strength solution of acetylcellulose in acetone, or 15 – 25 percent strength solution of polyacrylonitrile in dimethylformamide, which has been pigmented with 1,4-bis-(4,5,6,7-tetrachloro-benzthiazolyl-(2)-amino)-anthraquinone or 1,8-bis-(4,5,6,7-tetrachloro-benzoxazolyl-(2)-amino)-anthraquinone, respectively, the pigment having been brought to a finely divided state, are subjected to a dry spinning process.

k. 10,000 parts of a paper composition, containing 4 parts of cellulose per 100 parts, are treated for about 2 hours in a hollander. During this time, the following are added at quarter-hour intervals: 4 parts of resin glue, then 30 parts of a 16 percent strength pigment dispersion obtained by grinding 4.8 parts of 1,5-bis-(4,5,6,7-tetrachloro-benzthiazolyl-(2)-amino)-anthraquinone with 4.8 parts of dinaphthylmethanedisulphonic acid and 22 parts of water in a ball mill, and then 5 parts of aluminium sulphate. After finishing on the papermaking machine, a paper coloured red, or outstanding fastness to light and to solvents, is obtained.

Blue or red papers of similar fastness are obtained if the 1,5-bis-(4,5,6,7-tetrachloro-benzthiazolyl-(2)-amino-anthraquinone used is replaced by corresponding amounts of 1,4-bis-(4,5,6,7-tetrachloro-benzthiazolyl-(2)-amino)-anthraquinone or 1,8-bis-(4,5,6,7-tetrachloro-benzoxazolyl-(2)-amino)-anthraquinone, respectively.

l) The red-pigmented or blue-pigmented papers manufactured according to Example 1k) are impregnated with a 55% strength solution of a urea-formaldehyde resin in n-butanol and stoved at 140°C. Red or blue laminate papers of very good fastness to migration and outstanding fastness to light are obtained. A laminate paper of equal fastness properties is obtained by laminating a paper which has been printed by the intaglio printing process with a printing ink which contains one of the fine pigment pastes indicated in Example 1c) and water-soluble or saponifiable binders.

EXAMPLE 2

50 parts of 1,5-diamino-anthraquinone and 220 parts of 2-chloro-4,5,6,7-tetrabromo-benzthiazole are introduced into 1,000 parts of fused phenol at 100°.

The mixture is heated to 160° whilst stirring, and is kept at this temperature for 1 hour. Thereafter it is further heated for 8 hours to 180°, 1,200 parts of nitrobenzene are then run in, and the product is filtered off at 130°, washed with nitrobenzene heated to 120° and, after further cooling, with methanol, and dried at 100°. 221 parts of 1,5-bis-(4,5,6,7-tetrabromo-benzthiazolyl-(2)- amino)-anthraquinone are obtained in the form of small bluish-tinged red needles which give a yellow solution in concentrated sulphuric acid.

The processes of Examples 1b) to 1l) yield bluish-tinged red pigmentations of excellent fastness properties. If, instead of 1,5-diamino-anthraquinone the eqivalant amount of 1,5-dimercapto-anthraquinone is employed and instead of 2-chloro-4,5,6,7-tetrabromo-benzthiazole the equivalent amount of pentachloro-benzthiazole is employed, 105 parts of 1,5-bis-(4,5,6,7-tetrachloro-benzthiazolyl-(2)-mercapto)-anthraquinone are obtained in the form of hair-like yellow crystals which give a red solution in concentrated sulphuric acid and yield fast yellow pigmentations according to the processes of Examples 1b) to 1l).

If instead of 2-chloro-4,5,6,7-tetrabromo-benzthiazole the equivalent amount of 2-chloro-4,5,6,7-tetrabromo-benzoxazole is employed and the mixture is heated to 180° for 2 – 3 hours, 208 parts of 1,5-bis-(4,5,6,7-tetrabromo-benzoxazolyl-(2)-amino)-anthraquinone are obtained as small red needles which give a dark yellow solution in concentrated sulphuric acid and yield bluish-tinged red pigmentations of very good fastness properties in accordance with the processes of Examples 1b) to 1l).

If, instead of 1,5-diamino-anthraquinone the eqivalent amount of 1,4-diamino-anthraquinone is employed, instead of 2-chloro-4,5,6,7-tetrabromo-benzthiazole the equivalent amount of 2-chloro-4,5,6,7-tetrabromo-benzoxazole is employed, and the mixture is heated to 180° for 2 – 3 hours, 195 parts of 1,4-bis-(4,5,6,7-tetrabromo-benzoxazolyl-(2)-amino)-anthraquinone are obtained in the form of violet jagged needles which give a yellow-orange solution in concentrated sulphuric acid and yield very fast blue pigmentations in accordance with the processes of Examples 1b) to 1l).

Bromination of a mixture of 700 parts of chlorosulphonic acid, 100 parts of 2-chloro-benzthiazole, 2 parts of antimony-(III) chloride and 0.2 part of iodine with approx. 220 parts of bromine at a temperature slowly raised to 120° – 140° yields, after pouring out into water, washing with water until neutral and drying, 268 parts of 2-chloro-4,5,6,7-tetrabromo-benzthiazole as a colourless, pale reddish substance. Melting point 180° – 182°. If, instead of 2-chloro-benzthiazole, an equal amount of 2-chloro-benzoxazole is employed, 266 parts of 2-chloro-4,5,6,7-tetrabromo-benzoxazole are obtained in accordance with the same process as a colourless substance; melting point 183° – 186°.

Similar yields of these compounds are obtained on carrying out the reaction in nitrobenzene at 200° for 6 hours.

EXAMPLE 3:

50 parts of 1,4,5,8-tetraamino-anthraquinone and 200 parts of 2-chloro-4,5,6,7-tetrabromo-benzthiazole are introduced into 1,000 parts of fused phenol at 100° and the mixture is heated, whilst stirring, to 160° for 1 hour and to 180° for 8 hours. 1,000 parts of nitrobenzene are then run in and the product is filtered off at 140°, washed with nitrobenzene heated to 120° and, after further cooling, with methanol, and dried at 100°. 193 parts of 1,4,5,8-bis-(4,5,6,7-tetrabromo-benzthiazolyl-(2)-amino)-diamino]-anthraquinone are obtained as a blue-black, micro-crystalline substance which gives a red-brown solution in concentrated sulphuric acid and yields blue-green pigmentations of very good fastness properties in accordance with the process of Examples 1b) to 1l).

EXAMPLE 4:

40 parts of 1,2,4-triamino-anthraquinone and 11 parts of pentachloro-benzthiazole are introduced into 800 parts of fused phenol at 100° and the mixture is heated, whilst stirring, to 160° for 1 hour and to 180° for 7 hours. 800 parts of nitrobenzene are then run in and the product is filtered off at 120°, washed with nitrobenzene heated to 120° and, after further cooling, with methanol, and dried at 100°. 64 parts of 1,2,4-[bis-(4,5,6,7-tetrachloro-benzthiazolyl-(2)-amino)-amino]-anthraquinone are obtained in the form of brown-violet needles in the form of rosettes, which give a dirty brown solution in concentrated sulphuric acid and yield fast brown-violet pigmentations in accordance with the processes of Examples 1b), 1c), 1e), 1h) and 1i).

EXAMPLE 5:

50 parts of 1,8-diamino-anthraquinone in 600 parts of nitrobenzene are heated for 15 – 20 minutes at 200° – 210°, 65 parts of pentachloro-benzthiazole are then introduced at 180° and the mixture is heated to 210° for 1 hour. The product is then filtered off at 120°, washed with nitrobenzene heated to 120° and, after further cooling, with methanol, and is dried at 100°.

92 parts of 1-amino-8-(4,5,6,7-tetrachloro-benzthiazolyl-(2)-amino)-anthraquinone are obtained in the form of bluish-tinged red small crystal rods which give a dark yellow solution in concentrated sulphuric acid and yield blue-tinged red pigmentations of very good fastness properties in accordance with the processes of Examples 1b) to 1l).

EXAMPLE 6:

50 parts of 4,5-diamino-1,8-dihydroxy-anthraquinone and 90 parts of 2-chloro-4,5,6,7-tetrabromo-benzthiazole are introduced into 800 parts of fused phenol at 100° and the mixture is heated to 160° for 1 hour and subsequently to 180° for 7 hours. 100 parts of nitrobenzene are then run in and the product is filtered off at 120°, washed with nitrobenzene heated to 120° and, after further cooling, with methanol, and dried at 100°.

120 parts of 4-amino-5-(4,5,6,7-tetrabromo-benzthiazolyl-(2)-amino)-1,8-dihydroxy-anthraquinone are obtained in the form of blue-violet broad needles which give a blood-red solution in concentrated sulphuric acid and yield reddish-tinged blue pigmentations of high colour strength, brilliance and very good fastness properties in accordance with the processes of Examples 1b) to 1l).

If, instead of 4,5-diamino-1,8-dihydroxy-anthraquinone, the equivalent amount of 1,4-diamino-anthraquinone is employed, and, instead of 2-chloro-4,5,6,7-tetrabromobenzthiazole, the equivalent amount of pentachloro-benzoxazole is employed, 76 parts of 1-amino-4-(4,5,6,7-tetrachloro-benzoxazolyl-(2)-amino)-anthraquinone are obtained in the form of violet needles which give a red-brown solution in concentrated sulphuric acid and yield very fast violet pigmentations in accordance with the processes of Examples 1b) to 1l).

If, instead of 2-chloro-4,5,6,7-tetrabromo-benzthiazole, the equivalent amount of 2-chloro-4,5,6,7-tetrabromo-benzoxazole is employed and the mixture is heated to 180° for 2 – 3 hours, 105 parts of 4-amino-5-(4,5,6,7-tetrabromo-benzoxazolyl-(2)-amino)-1,8-dihydroxy-anthraquinone are obtained as blue-violet lancet-shaped crystals which give a red-violet solution in concentrated sulphuric acid and yield blue-violet, intensely coloured, brilliant and very fast pigmentations in accordance with the processes of Examples 1b) to 1l). Similar yields of these compounds are obtained on carrying out the reaction in nitrobenzene at 200° for 6 hours.

EXAMPLE 7:

50 parts of 1-amino-4-hydroxy-anthraquinone and 71 parts of pentachloro-benzthiazole are introduced into 700 parts of phenol at 100° and the mixture is heated, whilst stirring, for 2 hours to 160° and then for a further 4 hours to 180°. It is cooled to 70°, 700 parts of methanol are run in, and the product is filtered off at 70°, washed with methanol until free of phenol and dried at 100°. 96 parts of 1-(4,5,6,7-tetrachloro-benzthiazolyl-(2)-amino-4-hydroxy-anthraquinone are thus obtained in the form of violet needles which give a cherry-red solution in concentrated sulphuric acid and yield violet pigmentations of very good fastness properties, especially excellent fastness to light, in accordance with the processes of Examples 1b) to 1l). If, instead of 1-amino-4-hydroxy-anthraquinone, the same amount of 1-amino-anthraquinone is employed, instead of 700 parts 900 parts of phenol are employed, and instead of pentachloro-benzthiazole the equivalent amount of 2-chloro-4,5,6,7-tetrabromo-benzoxazole is employed, 127 parts of 1-(4,5,6,7-tetrabromo-benzoxazolyl-(2)-amino)-anthraquinone are obtained in the form of orange needles which give a red solution in concentrated sulphuric acid and yield orange pigmentations of very good fastness properties in accordance with the processes of Examples 1b) to 1l).

If, instead of 1-amino-4-hydroxy-anthraquinone the equivalent amount of 1-amino-5-benzoylamino-anthraquinone is employed, 97 parts of 1-(4,5,6,7-tetrachloro-benzthiazolyl-(2)-amino)-5-benzoylamino-anthroaquinone are obtained in the form of red, jagged small needles which give an olive-green solution in concentrated sulphuric acid and yield fast, yellowish-tinged red pigmentations in accordance with the processes of Examples 1b) to 1l).

If instead of 1-amino-4-hydroxy-anthraquinone the equivalent amount of 1-mercapto-anthraquinone is employed, 89 parts of 1-(4,5,6,7-tetrachloro-benzthiazolyl-(2)-mercapto)-anthraquinone are obtained in the form of small yellow needles which give a red solution in concentrated sulphuric acid and yield fast yellow pigmentations in accordance with the processes of Examples 1b) to 1l).

If, instead of 1-amino-4-hydroxy-anthraquinone the equivalent amount of 2-phenyl-6-amino-4,5-phthaloyl-benzimidazole is employed, and instead of pentachloro-benzothiazole the equivalent amount of pentachloro-benzoxazole is employed, 107 parts of 2-phenyl-6-(4,5,6,7-tetrachloro-benzoxazolyl-(2)-amino)-4,5-phthaloyl-benzimidazole are obtained in the form of small red needles which give a reddish-tinged yellow solution in concentrated sulphuric acid and yield fast red pigmentations in accordance with the process of Examples 1b) to 1l).

If, instead of 1-amino-4-hydroxy-anthraquinone the equivalent amount of 1-amino-4-(4,5,6,7-tetrachloro-benzthiazolyl-(2)-amino)-anthraquinone is employed and instead of pentachloro-benzthiazole the equivalent amount of pentachloro-benzoxazole is employed, 158 parts of 1-(4,5,6,7-tetrachloro-benzoxazolyl-(2)-amino)-4-(4,5,6,7-tetrachloro-benzthiazolyl-(2)-amino)-anthraquinone in the form of violet needles which give a red solution in concentrated sulphuric acid and yield very fast violet pigmentations in accordance with the processes of Examples 1b) to 1l) are thus obtained.

EXAMPLE 8:

50 parts of 1-(4,5,6,7-tetrachloro-benzthiazolyl-(2)-amino)-5-amino-anthraquinone, 30 parts of 1-chloro-anthraquinone, 20 parts of anhydrous sodium acetate, 20 parts of anhydrous sodium carbonate, 1 part of copper powder and 1 part of copper-(II) acetate are introduced into 900 parts of anhydrous nitrobenzene and the mixture is heated for 8 hours to 200°, whilst stirring. The product is filtered off at 150° and is washed with nitrobenzene heated to 150° and, after further cooling, with methanol. It was washed with hot water until neutral and dried at 100°. 54 parts of 1-(4,5,6,7-tetrachloro-benzthiazolyl-(2)-amino)-5-(1-anthraquinonyl-amino)-anthraquinone are thus obtained in the form of red-violet small needles which give a brown solution in concentrated sulphuric acid and which yield bluish-tinged red pigmentations of very good fastness properties in accordance with the processes of Examples 1b) to 1l).

EXAMPLE 9:

6.4 parts of thionyl chloride are added dropwise, at 60°, to a mixture of 120 parts of o-dichlorobenzene, 3.8 parts of N,N-dimethylformamide and 10 parts of 5-(4,5,6,7-tetrachloro-benzthiazolyl-(2)-amino)-1-amino-anthraquinone and the mixture is kept at 60° for a further hour and then for 2 hours at 80°. The product is filtered off hot, rinsed with 100 parts of o-dichlorobenzene heated to 80°, and then rinsed with methanol.

The filter cake is introduced into 80 parts of methanol, 9 parts of ammonium carbonate are added and the mixture is warmed, whilst stirring, to 40° for 1 hour and then to refluxing for a further hour. The product is filtered off hot, washed with hot water until neutral and dried at 100°. 9.3 parts of 5-(4,5,6,7-tetrachloro-benzthiazolyl-(2)-amino)-anthrapyrimidine are thus obtained as a dark red powder which gives a dark brown solution in concentrated sulphuric acid and yields red-brown, fast pigmentations in accordance with the processes of Examples 1c), 1e), 1g), 1h), 1i) and 1k).

EXAMPLE 10:

A mixture of 5 parts of 1-(4,5,6,7-tetrachloro-benzthiazolyl-(2)-amino)-4-amino-anthraquinone, 80 parts of anhydrous nitrobenzene, 0.2 part of pyridine and 3 parts of benzoyl chloride is heated to 200° – 205° over the course of 3 hours, whilst stirring, and kept thereat for a further 2 hours. It is then cooled at 70°, 100 parts of methanol are run in, and the product is filtered off at 70°, rinsed with methanol and with hot water until neutral, and dried at 100°. 6 parts of 1-(4,5,6,7-tetrachloro-benzthiazolyl-2-(amino)-4-benzoylamino-anthraquinone are thus obtained in the form of small violet needles which give a dark green solution in concentrated sulphuric acid and yield very fast violet pigmentations in accordance with the processes of Examples 1b) to 1l).

EXAMPLE 11:

5.1 parts of 1-(4,5,6,7-tetrachloro-benzthiazolyl-(2)-amino)-4-amino-anthraquinone, 1 part of terephthalic acid dichloride and 0.2 part of pyridine are introduced into 60 parts of anhydrous nitrobenzene and the mixture is heated to 205° over the course of 3 hours and kept at this temperature for a further 5 hours. The product is then filtered off at 150°, rinsed with nitrobenzene heated to 150° and, after further cooling, rinsed with methanol and subsequently with hot water until neutral, and dried at 100°.

5.6 parts of 1,4-bis-[4'-(4,5,6,7-tetrachloro-benzthiazolyl-(2)-amino)-anthraquinonyl-(1')-carbonylamino]-benzene are obtained in the form of red-violet small needles which give a red solution in concentrated sulphuric acid and yield violet pigmentations having very good fastness properties in accordance with the processes of Examples 1b) to 1l).

EXAMPLE 12:

2.9 parts of 2,5-dichlorobenzoic acid and 1,8 parts of thionyl chloride are stirred in 80 parts of anhydrous nitrobenzene, in the presence of 0.2 part of dimethylformamide, at 140° until the acid chloride has formed. Excess thionyl chloride, hydrogen chloride and sulphur dioxide are then expelled by means of a dry stream of air, 5.1 parts of 1-amino-4-[4,5,6,7-tetrachloro-benzthiazolyl-(2)-amino]-anthraquinone are introduced and the mixture is raised to 200° over the course of approx. 3 hours and kept at this temperature for a further 2 hours. After working-up in accordance with the instructions of Example 10, 5.6 parts of 1-[2,5 -dichlorobenzoylamino]-4-[4,5,6,7-tetrachloro-benzthiazolyl-(2)-amino]-anthraquinone are obtained in the form of luminous blue-violet small needles which give a brown-yellow solution in concentrated sulphuric acid and yield violet pigmentations with excellent fastness properties in accordance with the processes of Examples 1b) to 1l).

EXAMPLES 13 - 47:

If, following Examples 1a) or 2), the diamino- or dimercapto-anthraquinones listed therein are replaced by other, optionally substituted, diamino- or dimercapto-anthraquinones, the dyestuffs listed in the table which follows are obtained, which yield fast pigmentations, having the color shades indicated in the table, in accordance with the processes of Examples 1b) to 1l).

| Example | Dyestuff | Colour Shade |
| --- | --- | --- |
| 13 | 1,6-Bis-(4,5,6,7-tetrachloro-benzthiazolyl-(2)-amino)-anthraquinone | brownish-tinged red |
| 14 | 1,7-Bis-(4,5,6,7-tetrachloro-benzthiazolyl-(2)-amino)-anthraquinone | brownish-tinged red |
| 15 | 2,6-Bis-(4,5,6,7-tetrachloro-benzoxazolyl-(2)-amino)-anthraquinone | yellow-brown |
| 16 | 1,5-Bis-(4,5,6,7-tetrachloro-benzoxazolyl-(2)-amino)-anthraquinone | red |
| 17 | 1,4-Bis-(4,5,6,7-tetrachloro-benzoxazolyl-(2)-amino)-anthraquinone | red-violet |
| 18 | 1,6-Bis-(4,5,6,7-tetrachloro-benzoxazolyl-(2)-amino)-anthraquinone | brownish tinged red |
| 19 | 1,7-Bis-(4,5,6,7-tetrachloro-benzoxazolyl-(2)-amino)-anthraquinone | brownish-tinged red |
| 20 | 1,4-Bis-(4,5,6,7-tetrabromo-benzthiazolyl-(2)-amino)-anthraquinone | blue-violet |
| 21 | 1,6-Bis-(4,5,6,7-tetrabromo-benzthiazolyl-(2)-amino)-anthraquinone | chestnut |
| 22 | 1,7-Bis-(4,5,6,7-tetrabromo-benzthiazolyl-(2)-amino)-anthraquinone | chestnut |
| 23 | 1,8-Bis-(4,5,6,7-tetrachloro-benzoxazolyl-(2)-amino)-4,5-dihydroxy-anthraquinone | violet |
| 24 | 4,8-Bis-(4,5,6,7-tetrachloro-benzthiazolyl-(2)-amino)-1,5-dihydroxy-anthraquinone | blue-violet |
| 25 | 4,8-Bis-(4,5,6,7-tetrabromo-benzthiazolyl-(2)-amino)-1,5-dihydroxy-anthraquinone | blue |
| 26 | 4,8-Bis-(4,5,6,7-tetrachloro-benzthiazolyl-(2)-amino)-1-hydroxy-anthraquinone | violet |
| 27 | 4,8-Bis-(4,5,6,7-tetrachloro-benzoxazolyl-(2)-amino-1-hydroxy-anthraquinone | red-violet |
| 28 | 4,8-Bis-(4,5,6,7-tetrabromo-benzthiazolyl-(2)-amino)-1-hydroxy-anthraquinone | violet |
| 29 | 1,4-Bis-(4,5,6,7-tetrabromo-benzthiazolyl-(2)-amino)-5-nitro-anthraquinone | blue-green |
| 30 | 1,4-Bis-(4,5,6,7-tetrachloro-benzthiazolyl-(2)-amino)-5-nitro-anthraquinone | bluish-tinged green |
| 31 | 1,4-Bis-(4,5,6,7-tetrachloro-benzoxazolyl-(2)-amino)-5-nitro-anthraquinone | grey-green |
| 32 | 1,4-Bis-(4,5,6,7-tetrachloro-benzthiazolyl-(2)-amino)-5,8-dichloro-anthraquinone | blue |
| 33 | 1,4-Bis-(4,5,6,7-tetrabromo-benzthiazolyl-(2)-amino)-5,8-dichloro-anthraquinone | greenish-tinged blue |
| 34 | 1,4-Bis-(4,5,6,7-tetrachloro-benzoxazolyl-(2)-amino)-5,8-dichloro-anthraquinone | blue-violet |
| 35 | 1,5-Bis-(4,5,6,7-tetrabromo-bbenzthiazolyl-(2)-amino)-4-chloro-anthraquinone | bluish-tinged red |
| 36 | 1,5-Bis-(4,5,6,7-tetrachloro-benzthiazolyl-(2)-amino)-4-chloro-anthraquinone | bluish-tinged red |
| 37 | 1,5-Bis-(4,5,6,7-tetrachloro-benzoxazolyl-(2)-amino)-4-chloro-anthraquinone | red |
| 38 | 4,5-Bis-(4,5,6,7-tetrachloro-benzoxazolyl-(2)-amino)-1,8-dihydroxy-bromo-anthraquinone | blue |

| Example | Dyestuff | Colour Shade |
|---|---|---|
| 39 | 4,8-Bis-(4,5,6,7-tetrachloro-benzoxazolyl-(2)-amino)-1,5-dihydroxy-bromo-anthraquinone | blue |
| 40 | 4,4'-Bis-(4,5,6,7-tetrachloro-benzthiazolyl-(2)-amino)-1,1'-dianthrimide | greenish-tinged grey |
| 41 | 1,4-Bis-(4,5,6,7-tetrachloro-benzoxazolyl-(2)-mercapto)-anthraquinone | red-orange |
| 42 | 1,5-Bis-(4,5,6,7-tetrachloro-benzoxazolyl-(2)-mercapto)-anthraquinone | yellow |
| 43 | 1,8-Bis-(4,5,6,7-tetrachloro-benzoxazolyl-(2)-mercapto)-anthraquinone | yellow |
| 44 | 1,4-Bis-(4,5,6,7-tetrabromo-benzthiazolyl-(2)-mercapto)-anthraquinone | bluish-tinged red |
| 45 | 1,5-Bis-(4,5,6,7-tetrabromo-benzthiazolyl-(2)-mercapto)-anthraquinone | yellow |
| 46 | 1,8-Bis-(4,5,6,7-tetrachloro-benzthiazolyl-(2)-mercapto)-anthraquinone | yellow |
| 47 | 1,4-Bis-(4,5,6,7-tetrachloro-benzthiazolyl-(2)-mercapto)-anthraquinone | red |

EXAMPLES 48 and 49:

If, following Example 3, 2-chloro-4,5,6,7-tetrabromo-benzthiazole is replaced by pentachlorobenzthiazole or -oxazole, the following two dyestuffs are obtained, which yield fast pigmentations, in the colour shades indicated, in accordance with the processes of Examples 1b) to 1l).

| Example | Dyestuff | Colour Shade |
|---|---|---|
| 48 | 1,4,5,8-[Bis-(4,5,6,7-tetrachloro-benzthiazolyl-(2)-amino)-diamino]-anthraquinone | greenish-tinged blue |
| 49 | 1,4,5,8-[Bis-(4,5,6,7-tetrachloro-benzoxazolyl-(2)-amino)-diamino]-anthraquinone | blue |

EXAMPLES 50 – 54:

If, following Example 4, 1,2,4-triamino-anthraquinone is replaced by 4,5,8-triamino-1-hydroxy-anthraquinone and/or pentachloro-benzthiazole is replaced by 2-chloro-4,5,6,7-tetrabromo-benzthiazole or pentachloro-benzoxazole, the dyestuffs listed in the table which follows are obtained, which yield fast pigmentations, in the colour shades indicated, in accordance with the processes of Examples 1b) to 1l).

| Example | Dyestuff | Colour Shade |
|---|---|---|
| 50 | 1,2,4-[Bis-(4,5,6,7-tetrachloro-benzoxazolyl-(2)-amino)-amino]-anthraquinone | brown-violet |
| 51 | 1,2,4-[Bis-(4,5,6,7-tetrabromo-benzthiazolyl-(2)-amino)-amino]-anthraquinone | brownish-tinged violet |
| 52 | 4,5,8-[Bis-(4,5,6,7-tetrabromo-benzthiazolyl-(2)-amino)-amino]-1-hydroxy-anthraquinone | blue |
| 53 | 4,5,8-[Bis-(4,5,6,7-tetrachloro-benzthiazolyl-(2)-amino)-amino]-1-hydroxy-anthraquinone | blue |
| 54 | 4,5,8-[Bis-(4,5,6,7-tetrachloro-benzoxazolyl-(2)-amino)-amino]-1-hydroxy-anthraquinone | blue-violet |

EXAMPLES 55 – 92:

If, following Examples 5 or 6, the diamino-anthraquinones quoted therein are replaced by other diamino-anthraquinones, the dyestuffs indicated in the table which follows are obtained, which yield fast pigmentations, with the colour shades indicated in the table, in accordance with the processes of Examples 1b) to 1l).

| Example | Dyestuff | Colour Shade |
|---|---|---|
| 55 | 1-Amino-4-(4,5,6,7-tetrachloro-benzthiazolyl-(2)-amino)-anthraquinone | blue-violet |
| 56 | 1-Amino-4-(4,5,6,7-tetrabromo-benzthiazolyl-(2)-amino)-anthraquinone | blue-violet |
| 57 | 1-Amino-8-(4,5,6,7-tetrachloro-benzoxazolyl-(2)-amino)-anthraquinone | red |
| 58 | 1-Amino-8-(4,5,6,7-tetrabromo-benzthiazolyl-(2)-amino)-anthraquinone | bluish-tinged red |
| 59 | 1-Amino-5-(4,5,6,7-tetrachloro-benzthiazolyl-(2)-amino)-anthraquinone | yellowish-tinged red |

Continued

| Example | Dyestuff | Colour Shade |
|---|---|---|
| 60 | 1-Amino-5-(4,5,6,7-tetrabromo-benzthiazolyl-(2)-amino)-anthraquinone | red |
| 61 | 1-Amino-5-(4,5,6,7-tetrachloro-benzoxazolyl-(2)-amino)-anthraquinone | yellowish-tinged red |
| 62 | 1-Amino-6-(4,5,6,7-tetrachloro-benzoxazolyl-(2)-amino)-anthraquinone | brownish-tinged red |
| 63 | 1-Amino-6-(4,5,6,7-tetrabromo-benzthiazolyl-(2)-amino)-anthraquinone | brownish-tinged red |
| 64 | 1-Amino-6-(4,5,6,7-tetrachloro-benzthiazolyl-(2)-amino)-anthraquinone | brownish-tinged red |
| 65 | 1-Amino-7-(4,5,6,7-tetrabromo-benzthiazolyl-(2)-amino)-anthraquinone | brownish-tinged red |
| 66 | 1-Amino-7-(4,5,6,7-tetrachloro-benzthiazolyl-(2)-amino)-anthraquinone | brownish tinged red |
| 67 | 1-Amino-7-(4,5,6,7-tetrachloro-benzoxazolyl-(2)-amino)-anthraquinone | brownish-tinged red |
| 68 | 2-Amino-6-(4,5,6,7-tetrachloro-benzthiazolyl-(2)-amino)-anthraquinone | yellow-brown |
| 69 | 2-Amino-6-(4,5,6,7-tetrabromo-benzthiazolyl-(2)-amino)-anthraquinone | yellow-brown |
| 70 | 2-Amino-6-(4,5,6,7-tetrachloro-benzoxazolyl-(2)-amino)-anthraquinone | yellow-brown |
| 71 | 1-Amino-8-(4,5,6,7-tetrachloro-benzthiazolyl-(2)-amino)-4,5-dihydroxy-anthraquinone | blue |
| 72 | 1-Amino-5-(4,5,6,7-tetrabromo-benzthiazolyl-(2)-amino)-4,8-dihydroxy-anthraquinone | blue |
| 73 | 1-Amino-8-(4,5,6,7-tetrachloro-benzoxazolyl-(2)-amino)-4,5-dihydroxy-anthraquinone | blue-violet |
| 74 | 4-Amino-5-(4,5,6,7-tetrachloro-benzoxazolyl-(2)-amino-1,8-dihydroxy-anthraquinone | blue-violet |
| 75 | 4-Amino-5-(4,5,6,7-tetrachloro-benzthiazolyl-(2)-amino)-1,8-dihydroxy-anthraquinone | blue-violet |
| 76 | 1,4-[Amino-(4,5,6,7-tetrachloro-benzthiazolyl-(2)-amino)]-5-nitro-anthraquinone | greenish-tinged blue |
| 77 | 1,4-[Amino-(4,5,6,7-tetrabromo-benzthiazolyl-(2)-amino)]-5-nitro-anthraquinone | blue-green |
| 78 | 1,4-[Amino-(4,5,6,7-tetrachloro-benzoxazolyl-(2)-amino)]-5-nitro-anthraquinone | greenish-tinged blue |
| 79 | 1-Amino-4-(4,5,6,7-tetrachloro-benzthiazolyl-(2)-amino)-5,8-dichloro-anthraquinone | blue-violet |
| 80 | 1-Amino-4-(4,5,6,7-tetrabromo-benzthiazolyl-(2)-amino)-5,8-dichloro-anthraquinone | blue |
| 81 | 1-Amino-4-(4,5,6,7-tetrachloro-benzoxazolyl-(2)-amino)-5,8-dichloro-anthraquinone | violet |
| 82 | 1,5-[Amino-(4,5,6,7-tetrachloro-benzthiazolyl-(2)-amino)]-4-chloro-anthraquinone | red |
| 83 | 1,5-[Amino-(4,5,6,7-tetrachloro-benzoxazolyl-(2)-amino)]-4-chloro-anthraquinone | red |
| 84 | 1,5-[-Amino-(4,5,6,7-tetrabromo-benzthiazolyl-(2)-amino)]-4-chloro-anthraquinone | bluish-tinged red |
| 85 | 1-Amino-8-(4,5,6,7-tetrachloro-benzthiazolyl-(2)-amino)-4,5-dihydroxy-bromo-anthraquinone | blue |
| 86 | 1-Amino-8-(4,5,6,7-tetrachloro-benzoxazolyl-(2)-amino)-4,5-dihydroxy-bromo-anthraquinone | blue |
| 87 | 1-Amino-8-(4,5,6,7-tetrabromo-benzthiazolyl-(2)-amino)-4,5-dihydroxy-bromo-anthraquinone | blue |
| 88 | 4-Amino-8-(4,5,6,7-tetrabromo-benzthiazolyl-(2)-amino)-1,5-dihydroxy-bromo-anthraquinone | blue |
| 89 | 4-Amino-8-(4,5,6,7-tetrachloro-benzthiazolyl-(2)-amino)-1,5-dihydroxy-bromo-anthraquinone | blue |
| 90 | 4-Amino-8-(4,5,6,7-tetrachloro-benzoxazolyl-(2)-amino)-1,5-dihydroxy-anthraquinone | blue |
| 91 | 4-Amino-8-(4,5,6,7-tetrabromo-benzoxazolyl-(2)-amino)-1,5-dihydroxy-anthraquinone | blue |
| 92 | 1-Amino-8-(4,5,6,7-tetrabromo-benzoxazolyl-(2)-amino)-anthraquinone | bluish-tinged red |

EXAMPLES 93 – 255:

If, following Example 7 1-amino-4-hydroxy-anthraquinone or 1-mercapto-anthraquinone are replaced by other amino- or mercapto-anthraquinones and/or pentachlorobenzthiazole is replaced by 2-chloro-4,5,6,7-tetrabromo-benzthiazole or pentachloro-benzoxazole, the dyestuffs indicated in the table which follows are obtained, which yield fast pigmentations, having the colour shades indicated in the table, in accordance with the processes of Examples 1b) to 1l).

| Example | Dyestuff | Colour Shade |
|---|---|---|
| 93 | 1-(4,5,6,7-Tetrachloro-benzthiazolyl-(2)-amino-anthraquinone | orange |

Continued

| Example | Dyestuff | Colour Shade |
|---|---|---|
| 94 | 1-(4,5,6,7-Tetrabromo-benzthiazolyl-(2)-amino)-anthraquinone | red-orange |
| 95 | 1-(4,5,6,7-Tetrachloro-benzoxazolyl-(2)-amino)-anthraquinone | yellow-orange |
| 96 | 2-(4,5,6,7-Tetrachloro-benzoxazolyl-(2)-amino)-anthraquinone | yellow |
| 97 | 2-(4,5,6,7-Tetrachloro-benzthiazolyl-(2)-amino)-anthraquinone | yellow |
| 98 | 2-(4,5,6,7-Tetrabromo-benzthiazolyl-(2)-amino)-anthraquinone | yellow |
| 99 | 1-(4,5,6,7-Tetrabromo-benzthiazolyl-(2)-mercapto)-anthraquinone | yellow |
| 100 | 1-(4,5,6,7-Tetrachloro-benzoxazolyl-(2)-mercapto)-anthraquinone | yellow |
| 101 | 1-(4,5,6,7-Tetrachloro-benzoxazolyl-(2)-amino)-4-hydroxy-anthraquinone | red-violet |
| 102 | 1-(4,5,6,7-Tetrabromo-benzthiazolyl-(2)-amino)-4-hydroxy-anthraquinone | blue-violet |
| 103 | 1-(4,5,6,7-Tetrachloro-benzthiazolyl-(2)-amino)-5-hydroxy-anthraquinone | orange |
| 104 | 1-(4,5,6,7-Tetrabromo-benzthiazolyl-(2)-amino)-5-hydroxy-anthraquinone | orange |
| 105 | 1-(4,5,6,7-Tetrachloro-benzoxazolyl-(2)-amino)-5-hydroxy-anthraquinone | yellow-orange |
| 106 | 1-(4,5,6,7-Tetrachloro-benzoxazolyl-(2)-amino)-4-methoxy-anthraquinone | red-violet |
| 107 | 1-(4,5,6,7-Tetrabromo-benzthiazolyl-(2)-amino)-4-methoxy-anthraquinone | blue-violet |
| 108 | 1-(4,5,6,7-Tetrachloro-benzthiazolyl-(2)-amino)-4-methoxy-anthraquinone | violet |
| 109 | 1-(4,5,6,7-Tetrachloro-benzthiazolyl-(2)-amino)-4-isopropoxy-anthraquinone | violet |
| 110 | 1-(4,5,6,7-Tetrabromo-benzthiazolyl-(2)-amino)-4-isopropoxy-anthraquinone | violet |
| 111 | 1-(4,5,6,7-Tetrachloro-benzoxazolyl-(2)-amino)-4-isopropoxy-anthraquinone | violet |
| 112 | 1-(4,5,6,7-Tetrabromo-benzthiazolyl-(2)-amino)-2-methoxy-4-hydroxy-anthraquinone | violet |
| 113 | 1-(4,5,6,7-Tetrachloro-benzthiazolyl-(2)-amino)-2-methoxy-4-hydroxy-anthraquinone | violet |
| 114 | 1-(4,5,6,7-Tetrachloro-benzoxazolyl-(2)-amino)-2-methoxy-4-hydroxy-anthraquinone | violet |
| 115 | 1-(4,5,6,7-Tetrachloro-benzoxazolyl-(2)-amino)-4,5,8-trihydroxy-anthraquinone | violet |
| 116 | 1-(4,5,6,7-Tetrachloro-benzthiazolyl-(2)-amino)-4,5,8-trihydroxy-anthraquinone | violet |
| 117 | 1-(4,5,6,7-Tetrabromo-benzthiazolyl-(2)-amino)-4,5,8-trihydroxy-anthraquinone | violet |
| 118 | 3-(4,5,6,7-Tetrachloro-benzthiazolyl-(2)-amino)-1,2-dihydroxy-anthraquinone | brown-yellow |
| 119 | 3-(4,5,6,7-Tetrabromo-benzthiazolyl-(2)-amino)-1,2-dihydroxy-anthraquinone | brown-yellow |
| 120 | 3-(4,5,6,7-Tetrachloro-benzoxazolyl-(2)-amino)-1,2-dihydroxy-anthraquinone | brown-yellow |
| 121 | 2-(4,5,6,7-Tetrachloro-benzoxazolyl-(2)-amino)-3-hydroxy-anthraquinone | yellow |
| 122 | 2-(4,5,6,7-Tetrabromo-benzthiazolyl-(2)-amino)-3-hydroxy-anthraquinone | reddish-tinged yellow |
| 123 | 2-(4,5,6,7-Tetrachloro-benzthiazolyl-(2)-amino)-3-hydroxy-anthraquinone | yellow |
| 124 | 4-(4,5,6,7-Tetrachloro-benzthiazolyl-(2)-amino)-8-chloro-1-hydroxy-anthraquinone | violet |
| 125 | 4-(4,5,6,7-Tetrachloro-benzthiazolyl-(2)-amino)-8-chloro-1-methoxy-anthraquinone | violet |
| 126 | 4-(4,5,6,7-Tetrachloro-benzoxazolyl-(2)-amino)-8-chloro-1-methoxy-anthraquinone | violet |
| 127 | 4-(4,5,6,7-Tetrachloro-benzoxazolyl-(2)-amino)-8-chloro-1-hydroxy-anthraquinone | violet |
| 128 | 4-(4,5,6,7-Tetrabromo-benzthiazolyl-(2)-amino)-8-chloro-1-hydroxy-anthraquinone | violet |
| 129 | 4-(4,5,6,7-Tetrabromo-benzthiazolyl-(2)-amino)-8-chloro-1-methoxy-anthraquinone | violet |
| 130 | 2-(4,5,6,7-Tetrachloro-benzthiazolyl-(2)-amino)-1,4-dihydroxy-anthraquinone | brown-red |
| 131 | 2-(4,5,6,7-Tetrabromo-benzthiazolyl-(2)-amino)-1,4-dihydroxy-anthraquinone | brown-red |
| 132 | 2-(4,5,6,7-Tetrachloro-benzoxazolyl-(2)-amino)-1,4-dihydroxy-anthraquinone | brown-red |
| 133 | 5-(4,5,6,7-Tetrachloro-benzthiazolyl-(2)-amino)-1,4-dihydroxy-anthraquinone | brown-red |
| 134 | 5-(4,5,6,7-Tetrabromo-benzthiazolyl-(2)-amino)-1,4-dihydroxy-anthraquinone | brown-red |
| 135 | 5-(4,5,6,7-Tetrachloro-benzoxazolyl-(2)-amino)-1,4-dihydroxy-anthraquinone | brown-red |
| 136 | 1-(4,5,6,7-Tetrachloro-benzthiazolyl-(2)-amino)-4-chloro-anthraquinone | yellow-orange |
| 137 | 1-(4,5,6,7-Tetrabromo-benzthiazolyl-(2)-amino)-4-chloro-anthraquinone | yellow-orange |
| 138 | 1-(4,5,6,7-Tetrachloro-benzoxazolyl-(2)-amino)-4-chloro-anthraquinone | yellow |

Continued

| Example | Dyestuff | Colour Shade |
|---|---|---|
| 139 | 1-(4,5,6,7-Tetrachloro-benzthiazolyl-(2)-amino)-5-chloro-anthraquinone | orange |
| 140 | 1-(4,5,6,7-Tetrabromo-benzthiazolyl-(2)-amino)-5-chloro-anthraquinone | orange |
| 141 | 1-(4,5,6,7-Tetrachloro-benzoxazolyl-(2)-amino)-5-chloro-anthraquinone | yellow-orange |
| 142 | 1-(4,5,6,7-Tetrachloro-benzthiazolyl-(2)-amino)-6-chloro-anthraquinone | orange |
| 143 | 1-(4,5,6,7-Tetrabromo-benzthiazolyl-(2)-amino)-6-chloro-anthraquinone | orange |
| 144 | 1-(4,5,6,7-Tetrachloro-benzoxazolyl-(2)-amino)-6-chloro-anthraquinone | yellow-orange |
| 145 | 1-(4,5,6,7-Tetrachloro-benzoxazolyl-(2)-amino)-7-chloro-anthraquinone | yellow-orange |
| 146 | 1-(4,5,6,7-Tetrachloro-benzthiazolyl-(2)-amino)-7-chloro-anthraquinone | orange |
| 147 | 1-(4,5,6,7-Tetrabromo-benzthiazolyl-(2)-amino)-7-chloro-anthraquinone | orange |
| 148 | 1-(4,5,6,7-Tetrabromo-benzoxazolyl-(2)-amino)-5,8-dichloro-anthraquinone | orange |
| 149 | 1-(4,5,6,7-Tetrachloro-benzoxazolyl-(2)-amino)-5,8-dichloro-anthraquinone | orange |
| 150 | 1-(4,5,6,7-Tetrachloro-benzthiazolyl-(2)-amino)-5,8-dichloro-anthraquinone | orange |
| 151 | 1-(4,5,6,7-Tetrabromo-benzthiazolyl-(2)-amino)-5,8-dichloro-anthraquinone | orange |
| 152 | 1-(4,5,6,7-Tetrachloro-benzthiazolyl-(2)-amino)-6,7-dichloro-anthraquinone | orange |
| 153 | 1-(4,5,6,7-Tetrabromo-benzthiazolyl-(2)-amino)-6,7-dichloro-anthraquinone | orange |
| 154 | 1-(4,5,6,7-Tetrachloro-benzoxazolyl-(2)-amino)-6,7-dichloro-anthraquinone | orange |
| 155 | 1-(4,5,6,7-Tetrachloro-benzoxazolyl-(2)-amino)-6,7-difluoro-anthraquinone | orange |
| 156 | 1-(4,5,6,7-Tetrachloro-benzthiazolyl-(2)-amino)-6,7-difluoro-anthraquinone | orange |
| 157 | 1-(4,5,6,7-Tetrabromo-benzthiazolyl-(2)-amino)-6,7-difluoro-anthraquinone | orange |
| 158 | 1-(4,5,6,7-Tetrachloro-benzthiazolyl-(2)-amino)-6-fluoro-anthraquinone | orange |
| 159 | 1-(4,5,6,7-Tetrabromo-benzthiazolyl-(2)-amino-6-fluoro-anthraquinone | orange |
| 160 | 1-(4,5,6,7-Tetrachloro-benzoxazolyl-(2)-amino)-6-fluoro-anthraquinone | orange |
| 161 | 1-(4,5,6,7-Tetrachloro-benzthiazolyl-(2)-amino)-7-fluoro-anthraquinone | orange |
| 162 | 1-(4,5,6,7-Tetrabromo-benzthiazolyl-(2)-amino)-7-fluoro-anthraquinone | orange |
| 163 | 1-(4,5,6,7-Tetrachloro-benzoxazolyl-(2)-amino)-7-fluoro-anthraquinone | orange |
| 164 | 1-(4,5,6,7-Tetrachloro-benzoxazolyl-(2)-amino)-4,5,8-trichloro-anthraquinone | yellow |
| 165 | 1-(4,5,6,7-Tetrachloro-benzthiazolyl-(2)-amino)-4,5,8-trichloro-anthraquinone | yellow-orange |
| 166 | 1-(4,5,6,7-Tetrabromo-benzthiazolyl-(2)-amino)-4,5,8-trichloro-anthraquinone | orange |
| 167 | 1-(4,5,6,7-Tetrachloro-benzthiazolyl-(2)-amino)-4-nitro-anthraquinone | orange |
| 168 | 1-(4,5,6,7-Tetrabromo-benzthiazolyl-(2)-amino)-4-nitro-anthraquinone | orange |
| 169 | 1-(4,5,6,7-Tetrachloro-benzoxazolyl-(2)-amino)-4-nitro-anthraquinone | yellow-orange |
| 170 | 1-(4,5,6,7-Tetrachloro-benzthiazolyl-(2)-amino)-5-nitro-anthraquinone | red-orange |
| 171 | 1-(4,5,6,7-Tetrabromo-benzthiazolyl-(2)-amino)-5-nitro-anthraquinone | red |
| 172 | 1-(4,5,6,7-Tetrachloro-benzoxazolyl-(2)-amino)-5-nitro-anthraquinone | red |
| 173 | 4-(4,5,6,7-Tetrachloro-benzoxazolyl-(2)-amino)-1-methylamino-anthraquinone | red-violet |
| 174 | 4-(4,5,6,7-Tetrachloro-benzthiazolyl-(2)-amino)-1-butylamino-anthraquinone | violet |
| 175 | 4-(4,5,6,7-Tetrachloro-benzthiazolyl-(2)-amino)-1-dodecylamino-anthraquinone | violet |
| 176 | 4-(4,5,6,7-Tetrachloro-benzthiazolyl-(2)-amino)-1-octadecylamino-anthraquinone | violet |
| 177 | 4-(4,5,6,7-Tetrachloro-benzthiazolyl-(2)-amino)-1-cyclohexylamino-anthraquinone | greenish-tinged blue |
| 178 | 4-(4,5,6,7-Tetrachloro-benzoxazolyl-(2)-amino)-1-cyclohexylamino-anthraquinone | greenish-tinged blue |
| 179 | 4-(4,5,6,7-Tetrabromo-benzthiazolyl-(2)-amino)-1-cyclohexylamino-anthraquinone | greenish-tinged blue |
| 180 | 4-(4,5,6,7-Tetrabromo-benzthiazolyl-(2)-amino)-1-anilino-anthraquinone | greenish-tinged blue |
| 181 | 4-(4,5,6,7-Tetrachloro-benzthiazolyl-(2)-amino)-1-anilino-anthraquinone | greenish-tinged blue |
| 182 | 4-(4,5,6,7-Tetrachloro-benzoxazolyl-(2)-amino)-1-anilino-anthraquinone | greenish-tinged blue |
| 183 | 4-(4,5,6,7-Tetrachloro-benzthiazolyl-(2)-amino)-1-(p-toluidino)-anthraquinone | greenish-tinged blue |
| 184 | 4-(4,5,6,7-Tetrabromo-benzthiazolyl-(2)-amino)-1-(p-toluidino)-anthraquinone | greenish-tinged blue |

Continued

| Example | Dyestuff | Colour Shade |
|---|---|---|
| 185 | 4-(4,5,6,7-Tetrachloro-benzoxazolyl-(2)-amino)-1-(p-toluidino)-anthraquinone | greenish-tinged blue |
| 186 | 8-Chloro-5-(4,5,6,7-tetrachloro-benzthiazolyl-(2)-amino)-1,4-dihydroxy-anthraquinone | brown-red |
| 187 | 8-Nitro-4-(4,5,6,7-tetrachloro-benzthiazolyl-(2)-amino)-1,5-dihydroxy-anthraquinone | violet |
| 188 | 8-Nitro-4-(4,5,6,7-tetrachloro-benzoxazolyl-(2)-amino)-1,5-dihydroxy-anthraquinone | violet |
| 189 | 8-Nitro-4-(4,5,6,7-tetrabromo-benzthiazolyl-(2)-amino)-1,5-dihydroxy-anthraquinone | violet |
| 190 | 1-(4,5,6,7-Tetrachloro-benzoxazolyl-(2)-amino)-anthraquinone-2-carboxylic acid | red |
| 191 | 1-(4,5,6,7-Tetrachloro-benzoxazolyl-(2)-amino)-anthraquinone-2-carboxylic acid amide | red |
| 192 | 1-(4,5,6,7-Tetrachloro-benzoxazolyl-(2)-amino)-anthraquinone-2-carboxylic acid methyl ester | red |
| 193 | 1-(4,5,6,7-Tetrachloro-benzoxazolyl-(2)-amino)-anthraquinone-2-carboxylic acid butyl ester | red |
| 194 | 1-(4,5,6,7-Tetrachloro-benzoxazolyl-(2)-amino)-anthraquinone-2-carboxylic acid propyl ester | red |
| 195 | 1-(4,5,6,7-Tetrachloro-benzoxazolyl-(2)-amino)-2-acetyl-anthraquinone | red |
| 196 | 4-(4,5,6,7-Tetrachloro-benzoxazolyl-(2)-amino)-1-(p-toluenesulphamido)-2-(phenylsulphonyl)-anthraquinone | chestnut |
| 197 | 1-(4,5,6,7-Tetrachloro-benzthiazolyl-(2)-amino)-6-methylmercapto-anthraquinone | red-orange |
| 198 | 1-(4,5,6,7-Tetrabromo-benzthiazolyl-(2)-amino)-6-methylmercapto-anthraquinone | red-orange |
| 199 | 1-(4,5,6,7-Tetrachloro-benzoxazolyl-(2)-amino)-6-(4-chloro-phenylsulphonyl)-anthraquinone | red-orange |
| 200 | 1-(4,5,6,7-Tetrachloro-benzthiazolyl-(2)-amino)-6-(4-chloro-phenylsulphonyl)-anthraquinone | red-orange |
| 201 | 1-(4,5,6,7-Tetrachloro-benzoxazolyl-(2)-amino)-2-bromo-4-(p-toluenesulphamido)-anthraquinone | violet |
| 202 | 5-Chloro-8-(4,5,6,7-tetrachloro-benzthiazolyl-(2)-amino)-3,4-phthaloyl-acridone | grey |
| 203 | 5-Chloro-8-(4,5,6,7-tetrabromo-benzthiazolyl-(2)-amino)-3,4-phthaloyl-acridone | grey |
| 204 | 6-Chloro-2-(4,5,6,7-tetrachloro-benzoxazolyl-(2)-amino)-3,4-phthaloyl-acridone | blue |
| 205 | 4-(4,5,6,7-Tetrachloro-benzthiazolyl-(2)-amino)-1-(4-chloro-anilino)-anthraquinone | greenish-tinged blue |
| 206 | 4-(4,5,6,7-Tetrachloro-benzoxazolyl-(2)-amino)-1-(4-chloro-anilino)-anthraquinone | greenish-tinged blue |
| 207 | 4-(4,5,6,7-Tetrachloro-benzthiazolyl-(2)-amino)-1-(2,4-dichloro-anilino)-anthraquinone | greenish-tinged blue |
| 208 | 4-(4,5,6,7-Tetrachloro-benzthiazolyl-(2)-amino)-1-(2,4-dichloro-anilino)-anthraquinone | greenish-tinged blue |
| 209 | 4-(4,5,6,7-Tetrachloro-benzthiazolyl-(2)-amino)-1-(p-anisidino)-anthraquinone | greenish-tinged blue |
| 210 | 4-(4,5,6,7-Tetrabromo-benzthiazolyl-(2)-amino)-1-(p-anisidino)-anthraquinone | greenish-tinged blue |
| 211 | 4-(4,5,6,7-Tetrachloro-benzoxazolyl-(2)-amino)-1-(p-anisidino)-anthraquinone | greenish-tinged blue |
| 212 | 4-Methylamino-1-[p-(4,5,6,7-tetrachloro-benzthiazolyl-(2)-amino)-anilino]-anthraquinone | green |
| 213 | 4-Methylamino-1-[p-(4,5,6,7-tetrachloro-benzoxazolyl-(2)-amino)-anilino]-anthraquinone | green |
| 214 | 4-Methylamino-1-[p-(4,5,6,7-tetrabromo-benzthiazolyl-(2)-amino)-anilino]-anthraquinone | green |
| 215 | 1-(4,5,6,7-Tetrabromo-benzthiazolyl-(2)-amino)-4-(4,5,6,7-tetrachloro-benzoxazolyl-(2)-amino)-anthraquinone | violet |
| 216 | 1-(4,5,6,7-Tetrabromo-benzthiazolyl-(2)-amino)-4-(4,5,6,7-tetrachloro-benzthiazolyl-(2)-amino)-anthraquinone | violet |
| 217 | 1-(4,5,6,7-Tetrachloro-benzthiazolyl-(2)-amino)-5-(4,5,6,7-tetrachloro-benzoxazolyl-(2)-amino)-anthraquinone | red |
| 218 | 1-(4,5,6,7-Tetrabromo-benzthiazolyl-(2)-amino)-5-(4,5,6,7-tetrachloro-benzoxazolyl-(2)-amino)-anthraquinone | red |
| 219 | 1-(4,5,6,7-Tetrachloro-benzthiazolyl-(2)-amino)-5-(4,5,6,7-tetrabromo-benzthiazolyl-(2)-amino)-anthraquinone | red |
| 220 | 1-(4,5,6,7-Tetrachloro-benzoxazolyl-(2)-amino)-8-(4,5,6,7-tetrachloro-benzthiazolyl-(2)-amino)-anthraquinone | red |
| 221 | 1-(4,5,6,7-Tetrachloro-benzoxazolyl-(2)-amino)-8-(4,5,6,7-tetrabromo-benzthiazolyl-(2)-amino)-anthraquinone | red |
| 222 | 1-(4,5,6,7-Tetrachloro-benzoxazolyl-(2)-amino)-6-(4,5,6,7-tetrachloro-benzthiazolyl-(2)-amino)-anthraquinone | brown-red |

Continued

| Example | Dyestuff | Colour Shade |
|---|---|---|
| 223 | 1-(4,5,6,7-Tetrachloro-benzoxazolyl-(2)-amino)-6-(4,5,6,7-tetrabromo-benzthiazolyl-(2)-amino)-anthraquinone | brown-red |
| 224 | 1-(4,5,6,7-Tetrachloro-benzthiazolyl-(2)-amino)-7-(4,5,6,7-tetrachloro-benzoxazolyl-(2)-amino)-anthraquinone | brown-red |
| 225 | 1-(4,5,6,7-Tetrabromo-benzthiazolyl-(2)-amino)-7-(4,5,6,7-tetrachloro-benzoxazolyl-(2)-amino)-anthraquinone | brown-red |
| 226 | 2-(4,5,6,7-Tetrachloro-benzoxazolyl-(2)-amino)-6-(4,5,6,7-tetrachloro-benzthiazolyl-(2)-amino)-anthraquinone | yellow-brown |
| 227 | 2-(4,5,6,7-Tetrachloro-benzoxazolyl-(2)-amino)-6-(4,5,6,7-tetrabromo-benzthiazolyl-(2)-amino)-anthraquinone | yellow-brown |
| 228 | 4-(4,5,6,7-Tetrachloro-benzthiazolyl-(2)-amino)-8-(4,5,6,7-tetrabromo-benzthiazolyl-(2)-amino)-1,5-dihydroxy-anthraquinone | blue-violet |
| 229 | 4-(4,5,6,7-Tetrachloro-benzthiazolyl-(2)-amino)-8-(4,5,6,7-tetrachloro-benzoxazolyl-(2)-amino)-1,5-dihydroxy-anthraquinone | blue-violet |
| 230 | 4-(4,5,6,7-Tetrabromo-benzthiazolyl-(2)-amino)-8-(4,5,6,7-tetrachloro-benzoxazolyl-(2)-amino)-1,5-dihydroxy-anthraquinone | blue-violet |
| 231 | 1-(4,5,6,7-Tetrachloro-benzthiazolyl-(2)-amino)-8-(4,5,6,7-tetrachloro-benzoxazolyl-(2)-amino)-4,5-dihydroxy-anthraquinone | blue-violet |
| 232 | 1-(4,5,6,7-Tetrabromo-benzthiazolyl-(2)-amino)-8-(4,5,6,7-tetrachloro-benzoxazolyl-(2)-amino)-4,5-dihydroxy-anthraquinone | blue-violet |
| 233 | 4-(4,5,6,7-Tetrabromo-benzthiazolyl-(2)-amino)-8-(4,5,6,7-tetrachloro-benzoxazolyl-(2)-amino)-1-hydroxy-anthraquinone | violet |
| 234 | 4-(4,5,6,7-Tetrachloro-benzthiazolyl-(2)-amino)-8-(4,5,6,7-tetrabromo-benzthiazolyl-(2)-amino)-1-hydroxy-anthraquinone | violet |
| 235 | 4-(4,5,6,7-Tetrachloro-benzthiazolyl-(2)-amino)-8-(4,5,6,7-tetrachloro-benzoxazolyl-(2)-amino)-1-hydroxy-anthraquinone | red-violet |
| 236 | 1-(4,5,6,7-Tetrachloro-benzthiazolyl-(2)-amino)-4-(4,5,6,7-tetrabromo-benzthiazolyl-(2)-amino)-5-nitro-anthraquinone | blue-green |
| 237 | 1-(4,5,6,7-Tetrachloro-benzthiazolyl-(2)-amino)-4-(4,5,6,7-tetrabromo-benzthiazolyl-(2)-amino)-5,8-dichloro-anthraquinone | blue |
| 238 | 1-(4,5,6,7-Tetrachloro-benzthiazolyl-(2)-amino)-4-(4,5,6,7-tetrachloro-benzoxazolyl-(2)-amino)-5,8-dichloro-anthraquinone | blue-violet |
| 239 | 1-(4,5,6,7-Tetrachloro-benzthiazolyl-(2)-amino)-5-(4,5,6,7-tetrabromo-benzthiazolyl-(2)-amino)-4-chloro-anthraquinone | bluish-tinged red |
| 240 | 1,2,4-[Amino-(4,5,6,7-tetrachloro-benzthiazolyl-(2)-amino)-(4,5,6,7-tetrabromo-benzthiazolyl-(2)-amino)]-anthraquinone | brownish-tinged violet |
| 241 | 1,2,4-[Amino-(4,5,6,7-tetrachloro-benzthiazolyl-(2)-amino)-(4,5,6,7-tetrachloro-benzoxazolyl-(2)-amino)]-anthraquinone | brownish-tinged violet |
| 242 | 1,4,5,8-[Diamino-(4,5,6,7-tetrachloro-benzthiazolyl-(2)-amino)-(4,5,6,7-tetrabromo-benzthiazolyl-(2)-amino)]-anthraquinone | green-blue |
| 243 | 1,4,5,8-[Diamino-(4,5,6,7-tetrachloro-benzthiazolyl-(2)-amino)-(4,5,6,7-tetrachloro-benzoxazolyl-(2)-amino)]-anthraquinone | green-blue |
| 244 | 1,4,5,8-[Diamino-(4,5,6,7-tetrabromo-benzthiazolyl-(2)-amino)-(4,5,6,7-tetrachloro-benzoxazolyl-(2)-amino)]-anthraquinone | green-blue |
| 245 | 4,5,8-[Amino-(4,5,6,7-tetrachloro-benzthiazolyl-(2)-amino)-(4,5,6,7-tetrabromo-benzthiazolyl-(2)-amino)]-1-hydroxy-anthraquinone | blue |
| 246 | 4,5,8-[Amino-(4,5,6,7-tetrachloro-benzthiazolyl-(2)-amino)-(4,5,6,7-tetrachloro-benzoxazolyl-(2)-amino)]-1-hydroxy-anthraquinone | blue |
| 247 | 4-(4,5,6,7-Tetrachloro-benzthiazolyl-(2)-amino)-5-(4,5,6,7-tetrachloro-benzoxazolyl-(2)-amino)-1,8-dihydroxy-bromo-anthraquinone | blue |
| 248 | 4-(4,5,6,7-Tetrabromo-benzthiazolyl-(2)-amino)-5-(4,5,6,7-tetrachloro-benzoxazolyl-(2)-amino)-1,8-dihydroxy-bromo-anthraquinone | blue |
| 249 | 4-(4,5,6,7-Tetrachloro-benzthiazolyl-(2)-amino)-8-(4,5,6,7-tetrachloro-benzoxazolyl-(2)-amino)-1,5-dihydroxy-anthraquinone | blue |
| 250 | 4-(4,5,6,7-Tetrabromo-benzthiazolyl-(2)-amino)-8-(4,5,6,7-tetrachloro-benzthiazolyl-(2)-amino)-1,5-dihydroxy-anthraquinone | blue |

Continued

| Example | Dyestuff | Colour Shade |
|---|---|---|
| 251 | 4-(4,5,6,7-Tetrachloro-benzthiazolyl-(2)-amino)-4'-(4,5,6,7-tetrabromo-benzthiazolyl-(2)-amino)-1,1'-dianthrimide | greenish-tinged grey |
| 252 | 1-(4,5,6,7-Tetrachloro-benzthiazolyl-(2)-mercapto)-5-(4,5,6,7-tetrabromo-benzthiazolyl-(2)-mercapto)-anthraquinone | yellow |
| 253 | 1-(4,5,6,7-Tetrachloro-benzthiazolyl-(2)-mercapto)-8-(4,5,6,7-tetrachloro-benzoxazolyl-(2)-mercapto)-anthraquinone | yellow |
| 254 | 1-(4,5,6,7-Tetrachloro-benzthiazolyl-(2)-mercapto)-4-(4,5,6,7-tetrabromo-benzthiazolyl-(2)-mercapto)-anthraquinone | red |
| 255 | 1-(4,5,6,7-Tetrachloro-benzoxazolyl-(2)-mercapto)-4-(4,5,6,7-tetrabromo-benzthiazolyl-(2)-mercapto)-anthraquinone | red |

EXAMPLES 256 – 266:

If, following Example 8 1-(4,5,6,7-tetrachloro-benzthiazolyl-(2)-amino)-5-amino-anthraquinone is replaced by other polyamino-anthraquinones, which have only been reacted partially with compounds of the general formula V and still contain at least one free amino group and/or if 1-chloro-anthraquinone is replaced by Bz-1-bromo-benzanthrone, the dyestuffs indicated in the table are obtained, which yield fast pigmentations having the colour shades indicated in the table, in accordance with the processes of Examples 1b to 1l.

EXAMPLES 267 – 268:

If, following Example 9, 1-(4,5,6,7-tetrachloro-benzthiazolyl-(2)-amino)-5-amino-anthraquinone is replaced by the corresponding 4,5,6,7-tetrabromo-benzthiazolyl or 4,5,6,7-tetrachloro-benzoxazolyl compound, the following two dyestuffs are obtained, which yield fast pigmentations, having the colour shades indicated in the table, in accordance with the processes of Examples 1b) to 1l).

| Example | Dyestuff | Colour Shade |
|---|---|---|
| 267 | 5-(4,5,6,7-Tetrabromo-benzthiazolyl-(2)-amino)-anthrapyrimidine | red-brown |
| 268 | 5-(4,5,6,7-Tetrachloro-benzoxazolyl-(2)-amino)-anthrapyrimidine | red-brown |

EXAMPLES 269 – 360:

If, in accordance with Examples 10 or 11 or 12, 1-

| Example | Dyestuff | Colour Shade |
|---|---|---|
| 256 | 1-(4,5,6,7-Tetrabromo-benzthiazolyl-(2)-amino)-5-(1-anthraquinonyl-amino)-anthraquinone | brown-red |
| 257 | 1-(4,5,6,7-Tetrachloro-benzoxazolyl-(2)-amino)-5-(1-anthraquinonyl-amino)-anthraquinone | brown-red |
| 258 | 1-(4,5,6,7-Tetrachloro-benzthiazolyl-(2)-amino)-8-(1-anthraquinonyl-amino)-anthraquinone | chestnut |
| 259 | 1-(4,5,6,7-Tetrabromo-benzthiazolyl-(2)-amino)-8-(1-anthraquinonyl-amino)-anthraquinone | chestnut |
| 260 | 1-(4,5,6,7-Tetrachloro-benzthiazolyl-(2)-amino)-4-(1-anthraquinonyl-amino)-anthraquinone | chestnut |
| 261 | 1-(4,5,6,7-Tetrachloro-benzthiazolyl-(2)-amino)-5-(bz-1-benzanthronyl-amino)-anthraquinone | grey-violet |
| 262 | 1-(4,5,6,7-Tetrabromo-benzthiazolyl-(2)-amino)-5-(bz-1-benzanthronyl-amino)-anthraquinone | grey-violet |
| 263 | 1-(4,5,6,7-Tetrachloro-benzoxazolyl-(2)-amino)-5-(bz-1-benzanthronyl-amino)-anthraquinone | grey-violet |
| 264 | 1-(4,5,6,7-Tetrachloro-benzthiazolyl-(2)-amino)-4-(bz-1-benzanthronyl-amino)-anthraquinone | olive |
| 265 | 1-(4,5,6,7-Tetrachloro-benzoxazolyl-(2)-amino)-4-(bz-1-benzanthronyl-amino)-anthraquinone | olive |
| 266 | 1-(4,5,6,7-Tetrabromo-benzthiazolyl-(2)-amino)-8-(bz-1-benzanthronyl-amino)-anthraquinone | grey-violet |

(4,5,6,7-tetrachloro-benzthiazolyl-(2)-amino)-4-amino-anthraquinone is replaced by other polyamino-anthraquinones which have only been reacted partially with compounds of the general formula V and still contain at least one free amino group, and the carboxylic acids listed in Examples 10 - 12 are replaced by other carboxylic acids or their derivatives which can be used for acylations, or by sulphonic acids or their derivatives which can be used for acylations, the dyestuffs listed in the table are obtained, which yield fast pigmentations, having the colour shades indicated in the table, in accordance with the processes of Examples 1b to 1l.

| Example | Dyestuff | Colour Shade |
|---|---|---|
| 269 | 1-(4,5,6,7-Tetrachloro-benzthiazolyl-(2)-amino)-4-acetylamino-anthraquinone | violet |
| 270 | 1-(4,5,6,7-Tetrachloro-benzthiazolyl-(2)-amino)-4-phenylacetylamino-anthraquinone | violet |
| 271 | 1-(4,5,6,7-Tetrachloro-benzthiazolyl-(2)-amino)-4-propionylamino-anthraquinone | violet |
| 272 | 1-(4,5,6,7-Tetrachloro-benzthiazolyl-(2)-amino)-4-butyrylamino-anthraquinone | violet |
| 273 | 1-(4,5,6,7-Tetrachloro-benzthiazolyl-(2)-amino)-4-laurylamino-anthraquinone | violet |
| 274 | 1-(4,5,6,7-Tetrachloro-benzthiazolyl-(2)-amino)-4-palmitoylamino-anthraquinone | violet |
| 275 | 1-(4,5,6,7-Tetrachloro-benzthiazolyl-(2)-amino)-4-stearoylamino-anthraquinone | violet |
| 276 | 1-(4,5,6,7-Tetrachloro-benzthiazolyl-(2)-amino)-4-(2-chloro-benzoylamino)-anthraquinone | violet |
| 277 | 1-(4,5,6,7-Tetrachloro-benzthiazolyl-(2)-amino)-4-(3-chlorobenzoylamino)-anthraquinone | claret |
| 278 | 1-(4,5,6,7-Tetrachloro-benzthiazolyl-(2)-amino)-4-(4-chlorobenzoylamino)-anthraquinone | violet |
| 279 | 1-(4,5,6,7-Tetrachloro-benzthiazolyl-(2)-amino)-4-(4-fluoro-benzoylamino)-anthraquinone | violet |
| 280 | 1-(4,5,6,7-Tetrachloro-benzthiazolyl-(2)-amino)-4-(2,4-difluoro-benzoylamino)-anthraquinone | red-violet |
| 281 | 1-(4,5,6,7-Tetrachloro-benzthiazolyl-(2)-amino)-4-(2,4-dichloro-benzoylamino)-anthraquinone | red-violet |
| 282 | 1-(4,5,6,7-Tetrachloro-benzthiazolyl-(2)-amino)-4-(3,4-dichloro-benzoylamino)-anthraquinone | violet |
| 283 | 1-(4,5,6,7-Tetrachloro-benzthiazolyl-(2)-amino)-4-(2,4,5-trichloro-benzoylamino)-anthraquinone | blue-violet |
| 284 | 1-(4,5,6,7-Tetrachloro-benzthiazolyl-(2)-amino)-4-(2,3,4,5-tetrachloro-benzoyl-amino)-anthraquinone | blue-violet |
| 285 | 1-(4,5,6,7-Tetrachloro-benzthiazolyl-(2)-amino)-4-(2,3,4,5-tetrachloro-benzoyl-amino)-anthraquinone | blue-violet |
| 286 | 1-(4,5,6,7-Tetrachloro-benzthiazolyl-(2)-amino)-4-(2,3,4,6-tetrachloro-benzoyl-amino)-anthraquinone | blue-violet |
| 287 | 1-(4,5,6,7-Tetrachloro-benzthiazolyl-(2)-amino)-4-(2,3,4,5,6-pentachloro-benzoyl-amino)-anthraquinone | blue-violet |
| 288 | 1-(4,5,6,7-Tetrachloro-benzthiazolyl-(2)-amino)-4-(4-fluoro-2-chloro-benzoylamino)-anthraquinone | red-violet |
| 289 | 1-(4,5,6,7-Tetrachloro-benzthiazolyl-(2)-amino)-4-(2-fluoro-4-chloro-benzoyl-amino)-anthraquinone | red-violet |
| 290 | 1-(4,5,6,7-Tetrachloro-benzthiazolyl-(2)-amino)-4-(2-bromo-benzoylamino)-anthraquinone | violet |
| 291 | 1-(4,5,6,7-Tetrachloro-benzthiazolyl-(2)-amino)-4-(4-chloro-2-bromo-benzoylamino)-anthraquinone | red-violet |
| 292 | 1-(4,5,6,7-Tetrachloro-benzthiazolyl-(2)-amino)-4-(2-chloro-4-bromo-benzoylamino)-anthraquinone | red-violet |
| 293 | 1-(4,5,6,7-Tetrachloro-benzthiazolyl-(2)-amino)-4-(2,4-dibromo-benzoylamino)-anthraquinone | red-violet |
| 294 | 1-(4,5,6,7-Tetrachloro-benzthiazolyl-(2)-amino)-4-(2-nitro-benzoylamino)-anthraquinone | bluish-tinged red |
| 295 | 1-(4,5,6,7-Tetrachloro-benzthiazolyl-(2)-amino)-4-(3-nitro-benzoylamino)-anthraquinone | bluish-tinged red |
| 296 | 1-(4,5,6,7-Tetrachloro-benzthiazolyl-(2)-amino)-4-(4-nitro-benzoylamino)-anthraquinone | bluish tinged red |
| 297 | 1-(4,5,6,7-Tetrachloro-benzthiazolyl-(2)-amino)-4-(6-chloro-3-nitro-benzoylamino)-anthraquinone | bluish-tinged red |
| 298 | 1-(4,5,6,7-Tetrachloro-benzthiazolyl-(2)-amino)-4-(2,4-dinitro-benzoylamino)-anthraquinone | bluish-tinged red |
| 299 | 1-(4,5,6,7-Tetrachloro-benzthiazolyl-(2)-amino)-4-(3,4-dinitro-benzoylamino)-anthraquinone | bluish-tinged red |
| 300 | 1-(4,5,6,7-Tetrachloro-benzthiazolyl-(2)-amino)-4-(3,5-dinitro-benzoylamino)-anthraquinone | bluish-tinged red |

-Continued

| Example | Dyestuff | Colour Shade |
|---|---|---|
| 301 | 1-(4,5,6,7-Tetrachloro-benzthiazolyl-(2)-amino)-4-(2-methyl-benzoylamino)-anthraquinone | violet |
| 302 | 1-(4,5,6,7-Tetrachloro-benzthiazolyl-(2)-amino)-4-(3-methyl-benzoylamino)-anthraquinone | violet |
| 303 | 1-(4,5,6,7-Tetrachloro-benzthiazolyl-(2)-amino)-4-(4-methyl-benzoylamino)-anthraquinone | violet |
| 304 | 1-(4,5,6,7-Tetrachloro-benzthiazolyl-(2)-amino)-4-(3-trifluoromethyl-benzoyl-amino)-anthraquinone | violet |
| 305 | 1-(4,5,6,7-Tetrachloro-benzthiazolyl-(2)-amino)-4-(4-trifluoromethyl-benzoyl-amino)-anthraquinone | violet |
| 306 | 1-(4,5,6,7-Tetrachloro-benzthiazolyl-(2)-amino)-4-(4-nitro-3-methyl-benzoylamino)-anthraquinone | bluish-tinged red |
| 307 | 1-(4,5,6,7-Tetrachloro-benzthiazolyl-(2)-amino)-4-(3-nitro-4-methyl-benzoylamino)-anthraquinone | bluish-tinged red |
| 308 | 1-(4,5,6,7-Tetrachloro-benzthiazolyl-(2)-amino)-4-(4-tert.-butyl-benzoylamino)-anthraquinone | violet |
| 309 | 1-(4,5,6,7-Tetrachloro-benzthiazolyl-(2)-amino)-4-(4-phenyl-benzoylamino)anthraquinone | violet |
| 310 | 1-(4,5,6,7-Tetrachloro-benzthiazolyl-(2)-amino)-4-(2-hydroxy-benzoylamino)-anthraquinone | violet |
| 311 | 1-(4,5,6,7-Tetrachloro-benzthiazolyl-(2)-amino)-4-(2-methoxy-benzoylamino)-anthraquinone | violet |
| 312 | 1-(4,5,6,7-Tetrachloro-benzthiazolyl-(2)-amino)-4-(4-chloro-2-hydroxy-benzoylamino)-anthraquinone | violet |
| 313 | 1-(4,5,6,7-Tetrachloro-benzthiazolyl-(2)-amino)-4-(4-methoxy-benzoylamino)-anthraquinone | violet |
| 314 | 1-(4,5,6,7-Tetrachloro-benzthiazolyl-(2)-amino)-4-(4-chloro-3-nitro-benzoylamino)-anthraquinone | red-violet |
| 315 | 1-(4,5,6,7-Tetrachloro-benzthiazolyl-(2)-amino)-4-(3-chloro-4-hydroxy-benzoyl-amino)-anthraquinone | violet |
| 316 | 1-(4,5,6,7-Tetrachloro-benzthiazolyl-(2)-amino)-4-(3-nitro-4-methoxy-benzoylamino)-anthraquinone | red-violet |
| 317 | 1-(4,5,6,7-Tetrachloro-benzthiazolyl-(2)-amino)-4-[naphthoylamino-(1)]-anthraquinone | brown-violet |
| 318 | 1-(4,5,6,7-Tetrachloro-benzthiazolyl-(2)-amino)-4-(pyridine-3-carbonylamino)-anthraquinone | red-violet |
| 319 | 1-(4,5,6,7-Tetrachloro-benzthiazolyl-(2)-amino)-4-(2,6-dichloro-pyridine-4-carbonyl-amino)-anthraquinone | red-violet |
| 320 | 1-(4,5,6,7-Tetrachloro-benzthiazolyl-(2)-amino)-4-(2-chloro-pyridine-5-carbonyl-amino)-anthraquinone | red-violet |
| 321 | 1-(4,5,6,7-Tetrachloro-benzthiazolyl-(2)-amino)-4-(pyridine-4-carbonylamino)-anthraquinone | red-violet |
| 322 | 1-(4,5,6,7-Tetrachloro-benzthiazolyl-(2)-amino)-4-(3,5-bis-(methylsulphonyl)-isothiazole-4-carbonylamino)-anthraquinone | violet |
| 323 | 1-(4,5,6,7-Tetrachloro-benzthiazolyl-(2)-amino)-4-(3,5-bis-(methylmercapto)-iso-thiazole-4-carbonylamino-anthraquinone | red-violet |
| 324 | 1-(4,5,6,7-Tetrachloro-benzthiazolyl-(2)-amino)-4-(p-toluenesulphonylamino)-anthraquinone | bluish-tinged red |
| 325 | 1-(4,5,6,7-Tetrachloro-benzthiazolyl-(2)-amino)-4-(benzenesulphonylamino)-anthraquinone | bluish-tinged red |
| 326 | 1-(4,5,6,7-Tetrachloro-benzthiazolyl-(2)-amino)-4-(3-nitro-benzenesulphonylamino)-anthraquinone | bluish-tinged red |
| 327 | 1-(4,5,6,7-Tetrachloro-benzthiazolyl-(2)-amino)-4-(4-nitro-benzenesulphonylamino)-anthraquinone | bluish-tinged red |
| 328 | 1-(4,5,6,7-Tetrachloro-benzthiazolyl-(2)-amino)-4-(2-chloro-benzenesulphonyl-amino)-anthraquinone | bluish-tinged red |
| 329 | 1-(4,5,6,7-Tetrachloro-benzthiazolyl-(2)-amino)-4-(3-chloro-benzenesulphonylamino)-anthraquinone | bluish-tinged red |
| 330 | 1-(4,5,6,7-Tetrachloro-benzthiazolyl-(2)-amino)-4-(4-chloro-benzenesulphonyl-amino)-anthraquinone | bluish-tinged red |
| 331 | 1-(4,5,6,7-Tetrachloro-benzthiazolyl-(2)-amino)-4-(2,5-dichloro-benzenesulphonyl-amino)-anthraquinone | bluish-tinged red |
| 332 | 1-(4,5,6,7-Tetrachloro-benzthiazolyl-(2)-amino)-4-(3,4-dichloro-benzenesulphonyl-amino)-anthraquinone | bluish-tinged red |
| 333 | 1,2-Bis-[4'-(4,5,6,7-tetrachloro-benzthia-zolyl-(2)-amino)-anthraquinonyl-(1')-carbonylamino]-benzene | brownish-tinged red-violet |
| 334 | 1,3-Bis-[4'-(4,5,6,7-tetrachloro-benz-thiazolyl-(2)-amino)-anthraquinonyl-(1')-carbonylamino]-benzene | brownish tinged red-violet |

Continued

| Example | Dyestuff | Colour Shade |
|---|---|---|
| 335 | 1-(4,5,6,7-Tetrachloro-benzoxazolyl-(2)-amino)-5-benzoylamino-anthraquinone | orange |
| 336 | 1-(4,5,6,7-Tetrabromo-benzthiazolyl-(2)-amino)-5-benzoylamino-anthraquinone | red |
| 337 | 1-(4,5,6,7-Tetrachloro-benzthiazolyl-(2)-amino)-5-benzoylamino-anthraquinone | yellowish-tinged red |
| 338 | 1-(4,5,6,7-tetrachloro-benzthiazolyl-(2)-amino)-8-benzoylamino-anthraquinone | red |
| 339 | 1-(4,5,6,7-Tetrabromo-benzthiazolyl-(2)-amino)-4-benzoylamino-anthraquinone | violet |
| 340 | 1-(4,5,6,7-Tetrachloro-benzoxazolyl-(2)-amino)-4-benzoylamino-anthraquinone | red-violet |
| 341 | 1-(4,5,6,7-Tetrabromo-benzthiazolyl-(2)-amino)-8-benzoylamino-anthraquinone | red |
| 342 | 2-(4,5,6,7-Tetrachloro-benzthiazolyl-(2)-amino)-6-benzoylamino)-anthraquinone | yellow |
| 343 | 2-(4,5,6,7-Tetrabromo-benzthiazolyl-(2)-amino)-6-(2,5-dichloro-benzoylamino)-anthraquinone | yellow |
| 344 | 1-(4,5,6,7-Tetrachloro-benzthiazolyl-(2)-amino)-5-(2,5-dichloro-benzoylamino)-anthraquinone | yellowish-tinged red |
| 345 | 1-(4,5,6,7-Tetrachloro-benzthiazolyl-(2)-amino)-8-benzoylamino-4,5-dihydroxy-anthraquinone | blue-violet |
| 346 | 1-(4,5,6,7-Tetrabromo-benzthiazolyl-(2)-amino)-8-benzoylamino-4,5-dihydroxy-anthraquinone | blue-violet |
| 347 | 1-(4,5,6,7-Tetrachloro-benzoxazolyl-(2)-amino)-8-benzoylamino)-4,5-dihydroxy-anthraquinone | violet |
| 348 | 4-(4,5,6,7-Tetrachloro-benzoxazolyl-(2)-amino)-5-benzoylamino-1,8-dihydroxy-anthraquinone | violet |
| 349 | 4-(4,5,6,7-Tetrachloro-benzthiazolyl-(2)-amino)-5-benzoylamino-1,8i-dihydroxy-anthraquinone | blue-violet |
| 350 | 4-(4,5,6,7-Tetrabromo-benzthiazolyl-(2)-amino)-5-benzoylamino-1,8-dihydroxy-anthraquinone | blue-violet |
| 351 | 4-(4,5,6,7-Tetrachloro-benzthiazolyl-(2)-amino)-5-(pentachloro-benzoylamino)-1,8-dihydroxy-anthraquinone | blue-violet |
| 352 | 1-(4,5,6,7-Tetrachloro-benzthiazolyl-(2)-amino)-8-(pentachloro-benzoylamino)-4,5-dihydroxy-anthraquinone | blue-violet |
| 353 | 1-(4,5,6,7-Tetrabromo-benzthiazolyl-(2)-amino)-8-(2,5-dichloro-benzoylamino)-4,5-dihydroxy-anthraquinone | blue-violet |
| 354 | 1-(4,5,6,7-Tetrachloro-benzoxazolyl-(2)-amino)-8-(4-chloro-benzoylamino)-4,5-dihydroxy-anthraquinone | blue-violet |
| 355 | 4-(4,5,6,7-Tetrachloro-benzthiazolyl-(2)-amino)-5-(2,5-dichloro-benzoyl amino)-1,8-dihydroxy-anthraquinone | blue-violet |
| 356 | 4-(4,5,6,7-Tetrachloro-benzthiazolyl-(2)-amino)-5-(2,3,4,5-tetrachloro-benzoylamino)-1,8-dihydroxy-anthraquinone | blue-violet |
| 357 | 1,2,4-[Bis-(4,5,6,7-tetrachloro-benzthiazolyl-(2)-amino)-benzoyl-amino]-anthraquinone | brown-violet |
| 358 | 4-(4,5,6,7-Tetrachloro-benzoxazolyl-(2)-amino)-8-benzoylamino-1,5-dihydroxy-bromo-anthraquinone | blue-violet |
| 359 | 1-(4,5,6,7-Tetrachloro-benzthiazolyl-(2)-amino)-4-benzoylamino-5,8-dichloro-anthraquinone | violet |
| 360 | 1-(4,5,6,7-Tetrachloro-benzthiazolyl-(2)-amino)-4-(2-chloro-benzoylamino)-5-nitro-anthraquinone | violet |

We claim:
1. Dyestuff free of sulfonic acid groups of the general formula

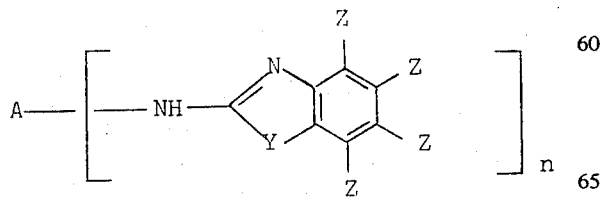

wherein
A denotes anthraquinone or anthraquinone substituted by 1 to 3 substituents selected from the group consisting of hydroxyl, chlorine, amino, methoxy or anilino,
Y denotes S or O,
Z denotes chlorine or bromine,
n denotes 1 or 2 and wherein the tetrahalobenzazolylamino groups are attached to the α-positions of the anthraquinone nucleus.
2. Dyestuff of claim 1 wherein Z denotes bromine.
3. The dyestuff of claim 1 having the formula

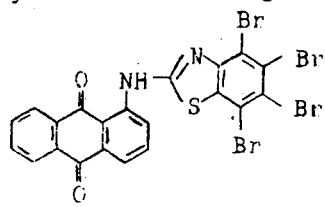

* * * * *